US010699152B1

(12) United States Patent
Adam et al.

(10) Patent No.: US 10,699,152 B1
(45) Date of Patent: Jun. 30, 2020

(54) IMAGE DATA ILLUMINATION DETECTION

(71) Applicant: Amazon Technologies, Inc., Seattle, WA (US)

(72) Inventors: Amit Adam, Haifa (IL); Igor Kviatkovsky, Haifa (IL); Ehud Benyamin Rivlin, Haifa (IL); Gerard Guy Medioni, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 165 days.

(21) Appl. No.: 15/841,241

(22) Filed: Dec. 13, 2017

(51) Int. Cl.
*G06K 9/46* (2006.01)
*G06K 9/20* (2006.01)
*G06K 9/00* (2006.01)
*G06K 9/78* (2006.01)
*G06K 9/62* (2006.01)

(52) U.S. Cl.
CPC ....... *G06K 9/4661* (2013.01); *G06K 9/00771* (2013.01); *G06K 9/209* (2013.01); *G06K 9/2027* (2013.01); *G06K 9/6202* (2013.01); *G06K 9/78* (2013.01)

(58) Field of Classification Search
None
See application file for complete search history.

(56) References Cited

U.S. PATENT DOCUMENTS

| 6,628,298 | B1 | 9/2003 | Debevec |
| 7,218,324 | B2 * | 5/2007 | Pfister ................... G06T 7/40 345/426 |
| 7,225,980 | B2 | 6/2007 | Ku et al. |
| 7,949,568 | B2 | 5/2011 | Fano et al. |
| 8,009,864 | B2 | 8/2011 | Linaker et al. |
| 8,175,925 | B1 | 5/2012 | Rouaix |
| 8,189,855 | B2 | 5/2012 | Opalach et al. |
| 8,423,431 | B1 | 4/2013 | Rouaix et al. |
| 8,630,924 | B2 | 1/2014 | Groenevelt et al. |
| 8,688,598 | B1 | 4/2014 | Shakes et al. |
| 8,938,119 | B1 * | 1/2015 | Han ................... G06T 5/008 382/163 |
| 9,473,747 | B2 | 10/2016 | Kobres et al. |

(Continued)

OTHER PUBLICATIONS

Abhaya Asthana et al., "An Indoor Wireless System for Personalized Shopping Assistance", Proceedings of IEEE Workshop on Mobile Computing Systems and Applications, 1994, pp. 69-74, Publisher: IEEE Computer Society Press.

(Continued)

*Primary Examiner* — Anand P Bhatnagar
(74) *Attorney, Agent, or Firm* — Athorus, PLLC

(57) ABSTRACT

Described is a method for processing image data to determine if a portion of the imaged environment is exposed to high illumination, such as sunlight. In some implementations, image data from multiple different imaging devices may be processed to produce for each imaging device a respective illumination mask that identifies pixels that represent a portion of the environment that is exposed to high illumination. Overlapping portions of those illumination masks may then be combined to produce a unified illumination map of an area of the environment. The unified illumination map identifies, for different portions of the environment, a probability that the portion is actually exposed to high illumination.

20 Claims, 13 Drawing Sheets

(56) References Cited

U.S. PATENT DOCUMENTS

| | | | |
|---|---|---|---|
| 9,613,423 B2* | 4/2017 | Dixon | H04N 5/2354 |
| 9,992,847 B2* | 6/2018 | Zeidler | H05B 37/0218 |
| 10,282,852 B1* | 5/2019 | Buibas | G06K 9/00771 |
| 10,311,910 B2* | 6/2019 | Nagami | G11B 17/043 |
| 10,360,723 B2 | 7/2019 | Mills et al. | |
| 10,375,264 B2 | 8/2019 | Debevec et al. | |
| 2002/0186314 A1* | 12/2002 | Debevec | G03B 15/02 |
| | | | 348/371 |
| 2003/0002712 A1 | 1/2003 | Steenburgh et al. | |
| 2004/0181467 A1 | 9/2004 | Raiyani et al. | |
| 2005/0285860 A1 | 12/2005 | Pfister et al. | |
| 2008/0055087 A1 | 3/2008 | Horii et al. | |
| 2008/0077511 A1 | 3/2008 | Zimmerman | |
| 2008/0109114 A1 | 5/2008 | Orita et al. | |
| 2009/0121017 A1 | 5/2009 | Cato et al. | |
| 2009/0245573 A1 | 10/2009 | Saptharishi et al. | |
| 2011/0011936 A1 | 1/2011 | Morandi et al. | |
| 2012/0274937 A1 | 11/2012 | Hays et al. | |
| 2012/0284132 A1 | 11/2012 | Kim et al. | |
| 2013/0076898 A1 | 3/2013 | Philippe et al. | |
| 2013/0253700 A1 | 9/2013 | Carson et al. | |
| 2014/0279294 A1 | 9/2014 | Field-Darragh et al. | |
| 2014/0293091 A1* | 10/2014 | Rhoads | G01J 3/513 |
| | | | 348/234 |
| 2014/0362223 A1 | 12/2014 | LaCroix et al. | |
| 2015/0019391 A1 | 1/2015 | Kumar et al. | |
| 2015/0073907 A1 | 3/2015 | Purves et al. | |
| 2015/0316231 A1 | 11/2015 | Trapani | |
| 2016/0155261 A1* | 6/2016 | Iborra Olba | G06T 15/506 |
| | | | 345/426 |
| 2016/0345404 A1* | 11/2016 | Zeidler | H05B 37/0218 |
| 2017/0257925 A1 | 9/2017 | Forbis et al. | |
| 2017/0318178 A1* | 11/2017 | Debevec | H04N 1/0284 |
| 2017/0352275 A1 | 12/2017 | Maruyama et al. | |
| 2018/0153019 A1 | 5/2018 | Forbis et al. | |
| 2019/0045162 A1* | 2/2019 | Krestyannikov | H04N 5/3572 |

OTHER PUBLICATIONS

Cristian Pop, "Introduction to the BodyCom Technology", Microchip AN1391, May 2, 2011, pp. 1-24, vol. AN1391, No. DS01391A, Publisher: 2011 Microchip Technology Inc.

* cited by examiner

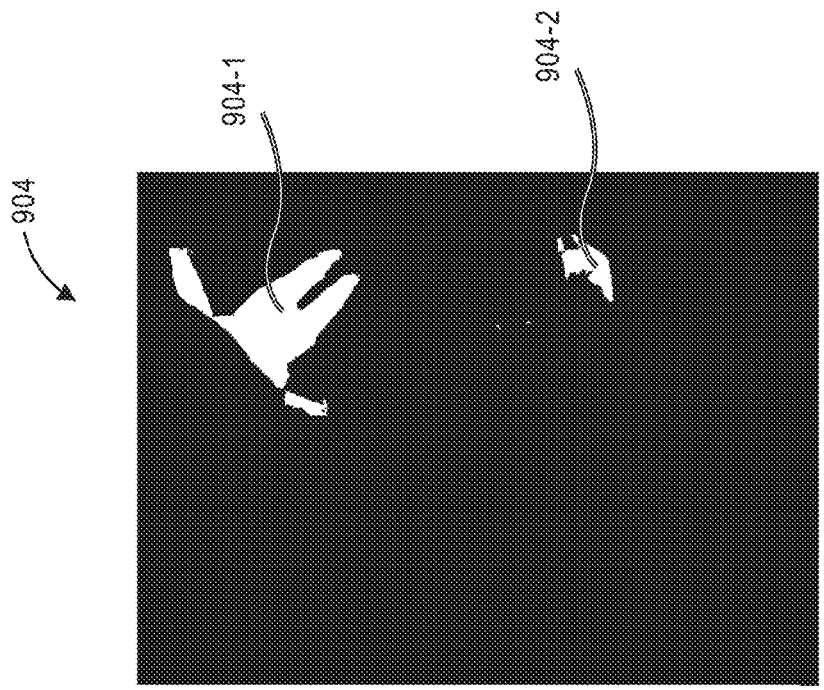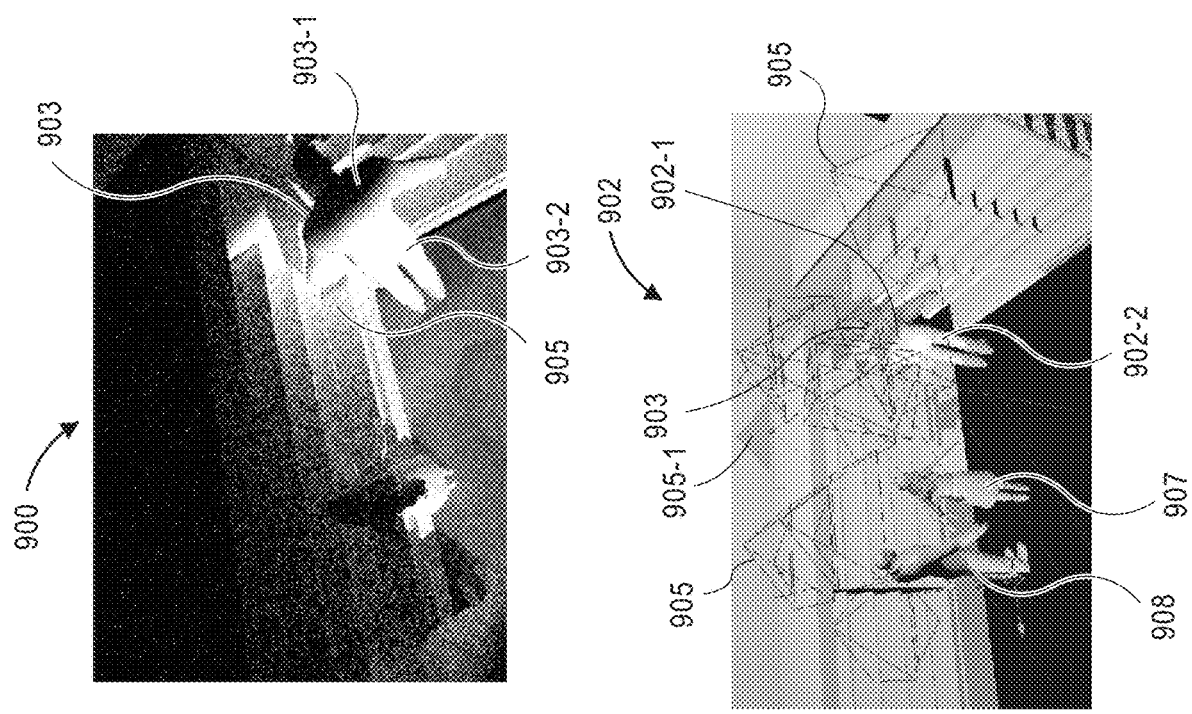
FIG. 9

IMAGE DATA ILLUMINATION DETECTION

BACKGROUND

Today, imaging devices such as digital cameras are frequently used for monitoring facilities. For example, digital cameras are often used to monitor the arrivals or departures of goods or the performance of services in materials handling facilities such as warehouses, fulfillment centers, retail establishments or other like facilities, as well as the travels of persons or objects in locations such as airports, stadiums or other dense environments, or the flow of traffic on one or more sidewalks, roadways or highways. Digital cameras are commonplace in financial settings such as banks or casinos, where money changes hands in large amounts or at high rates of speed.

When conducting monitoring operations, digital cameras may be aligned and configured to capture imaging data such as still or moving images of actions or events occurring within their respective fields of view. Information regarding the captured imaging data or the observed actions or events may be subjected to further analysis to identify aspects, elements or features of the content expressed therein. In performing such operations, digital cameras may be utilized alone or in groups and objects may be tracked as they move between fields of views of different cameras.

In environments with varying lighting conditions, such as materials handling facilities, transportation centers, financial institutions or like structures in which different light sources are present in different areas, it may be difficult to determine events in regions of images that become exposed to illumination from the different light sources.

BRIEF DESCRIPTION OF THE DRAWINGS

FIG. 9 illustrates a current image and a corresponding simulated image, in accordance with described implementations.

DETAILED DESCRIPTION

Figure 1:
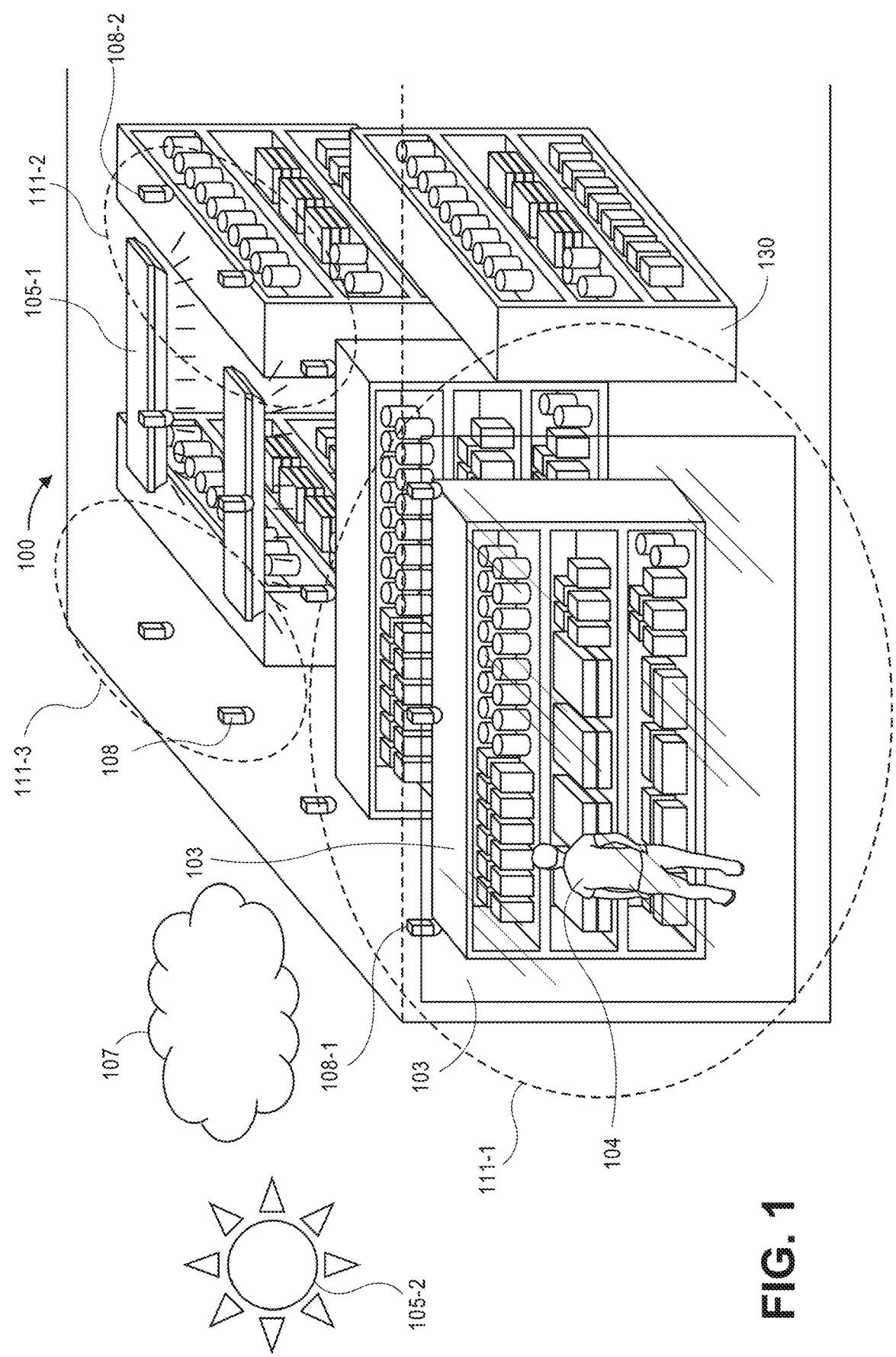
FIG. 1 is a diagram illustrating a materials handling facility with varying lighting conditions, in accordance with described implementations.

This disclosure describes methods, systems, and apparatus for processing image data to determine if a portion of an environment represented by the image data is exposed to high illumination, such as sunlight, and/or to determine if pixels of image data represent a portion of an environment that is exposed to high illumination. In some implementations, current image data from an imaging device, such as a camera, may be compared to background image data for that imaging device to determine portions of the imaged environment that are exposed to high illumination. Based on the comparison of the current image data with the background image data, an illumination mask may be generated that identifies pixels of the current image data that are determined to represent a portion of the environment that is exposed to high illumination.

In some implementations, multiple illumination masks for multiple different imaging devices that have overlapping views may be combined to produce a unified illumination map indicating a probability that a portion of the environment is exposed to high illumination. For example, illumination masks from a plurality of different imaging devices that have a view of an inventory location may be combined to produce a unified illumination map for that inventory location. The unified illumination map may indicate, for different portions of the inventory area, a probability that the portion of the inventory area is actually exposed to high illumination, such as sunlight.

In some implementations, the image data may further be processed to determine if foreground objects, such as agents, positioned within the environment are exposed to high illumination. In such implementations, simulated illumination masks may be generated by simulating the environment and simulating projections of an illumination into the environment from different directions. When current image data is received, the illumination mask generated for that current image data may then be compared with simulated illumination masks to determine a direction of the illumination and/or a direction of the light source. In addition, a size, shape, and/or position of one or more foreground objects represented in the current image data may be determined and used to render a simulation of the one or more objects in the simulated environment. A simulated illumination may then be projected into the simulated environment from the determined direction of the light source. By simulating a projection of illumination from the determined direction, it can be determined which portions of the simulated foreground objects are exposed to high illumination. Because the simulation is aligned with the position of the imaging device that rendered the current image data, based on the portions of the foreground objects determined to be exposed to illumination in the simulation, it may further be determined which pixels of the current image data represent a portion of the foreground objects within the environment that are exposed to high illumination.

In some implementations, the illumination mask of the current image data may be updated to include an indication for pixels representative of the foreground objects as to whether those pixels represent a portion of the foreground object that is exposed to high illumination. In other implementations, a foreground object illumination mask may be generated that includes, for each pixel or group of pixels of the current image data representative of a foreground object, an indication as to whether the pixel or group of pixels represent a portion of the foreground object that is exposed to high illumination.

Likewise, the unified illumination map of the environment may also be updated to include a probability of high illumination exposure for the foreground objects by combining the foreground object illumination masks of the imaging devices with overlapping fields of view. In other implementations, a unified foreground object illumination map may be generated based on foreground object illumination masks generated from image data of different imaging device that include a view of the foreground object. Like the unified illumination map, the unified foreground object illumination map indicates, for different portions of the foreground objects, a probability that the portion is exposed to high illumination.

As used herein, a materials handling facility may include, but is not limited to, warehouses, distribution centers, cross-docking facilities, order fulfillment facilities, packaging facilities, shipping facilities, rental facilities, libraries, retail stores, wholesale stores, museums, banks, casinos, airports, or other facilities or combinations of facilities for performing one or more functions of materials (inventory) handling.

"Exposure" is used herein as it is understood in the art. Specifically, exposure refers to the amount of light per unit area (the image plane illuminance times the exposure time) reaching the image sensor, as determined by shutter speed, lens aperture, and sensor sensitivity (ISO) of an imaging device. Exposure is measured in lux seconds. An image, or pixels of an image are considered overexposed when the pixels experience a loss of detail or data such that portions of the imaged object are not represented by the data and the brighter areas represented by the pixels cannot be distinguished from white. Likewise, illumination may be considered "high illumination" when image data representative of the object on which the illumination is shining loses some or all detail or data (e.g., pixel values) representative of the object due to the illumination. The illumination may be from sunlight, indirect light, artificial light (e.g., flashlight, ceiling light), etc.

FIG. 1 is a block diagram of a portion of a materials handling facility 100 with varying lighting conditions, in accordance with described implementations. In the illustrated example, the materials handling facility 100 may include a plurality of inventory locations 130 and one or more artificial illumination sources, such as ceiling lighting 105-1, floor lighting, etc., that produce light within the materials handling facility 100. In addition to the illumination sources 105-1 within the materials handling facility, other illumination sources, such as natural illumination sources, including the sun 105-2 or moon, and/or other artificial illumination sources external to the materials handling facility may impart light within one or more areas of the materials handling facility. For example, the materials handling facility may include one or more transparent or semi-transparent perimeters, such as a window 103, doors, skylights, etc., through which illumination produced from natural and/or artificial illumination source(s) external to the materials handling facility passes to illuminate areas 111 within the materials handling facility.

Light or illumination falls on every portion or point within an environment, such as the interior of a materials handling facility, and is then reflected from that environment point. The illumination sources 105 that generate the light reaching different areas within an environment may be characterized by their geometric properties and by their photometric properties. Examples of geometric properties are their shape (e.g., a point source, a light strip (linear source), an area source (sun, moon)) and the directions at which the illumination source 105 spreads the light. The photometric properties of an illumination source 105 refer to the intensity of illumination that the illumination source 105 emits. In addition, illumination sources 105 generally produce light at different wavelengths. Therefore, we refer to the intensity of light as a function of wavelength, or spectrum. In addition to direct light within an environment, there is also ambient light, which refers to light from all sources that is reflected from other points within the environment (e.g., walls, floors, and ceilings).

Once light falls on an environment point, some of the light is reflected while other parts of the light are absorbed, or reflected in a different direction. In general, we specify the way an object or other material interacts with light by specifying how much light is reflected in every direction, for every incoming direction of the light. The reflectiveness of an object may be referred to as Bidirectional Reflectance Distribution Function ("BRDF"), which may also depend on the wavelength of the light. For purposes of this discussion, we will consider all surfaces of objects as evenly reflecting light in all directions. In addition, we will refer to the albedo or intrinsic reflectance of an object as the measure of percentage of light that is reflected by the surface of the object. As an example, a black surface has zero reflectance because it absorbs all incoming light. In addition, because the implementations discussed herein relate to detecting high illumination (e.g., sunlight) represented in color images, we will assume that reflected light can be represented based on a certain amount of the light reflected in each of the red, green, and blue wavelengths. Light entering the environment can be measured in photons per unit of area per second. Radiance is the amount of reflected light per unit of solid angle in a given direction. Light that enters a camera lens is captured by a photoreceptor on the camera CCD, where it induces a charge amount proportional to its intensity. This amount is linearly amplified by two camera parameters, gain and integration time, which the camera modifies to ensure that a majority of the field of view has proper exposure.

The materials handling facility also includes a network of imaging devices 108. In the illustrated example, each imaging device is arranged in a fixed overhead location and positioned to produce overhead image data of objects located within the field of view of the imaging device. As discussed further below with respect to FIG. 2, any number of imaging devices may be utilized and the imaging devices 108 may be arranged such that the field of view of two or more imaging devices at least partially overlap. In addition, while the example illustrated in FIG. 1 illustrates the imaging devices 108 positioned toward a ceiling of the materials handling facility, in other implementations, as discussed below with respect to FIG. 11, the imaging devices may be at any position within the materials handling facility.

While the implementations discussed herein describe imaging devices in the form of digital color cameras or digital color video cameras, it will be appreciated that the imaging devices may be any form of imaging device including, but not limited to, digital cameras, depth sensors, range cameras, infrared cameras, or radiographic cameras. Likewise, the image data produced by the imaging devices may include, but is not limited to, visual image data, depth image data, infrared image data, radiographic image data, etc. Such devices generally operate by capturing light that is reflected from objects within an environment and integrating the light with a sensor.

Reflected light may be captured or detected by an imaging device if the reflected light is within the device's field of view, which is defined as a function of a distance between a sensor and a lens within the imaging device, viz., a focal length, as well as a location of the imaging device and an angular orientation of the imaging device's lens. Accordingly, where an object appears within a depth of field, or a distance within the field of view where the clarity and focus is sufficiently sharp, an imaging device may capture light that is reflected off objects of any kind to a sufficiently high degree of resolution using one or more sensors thereof, convert, and store information regarding the reflected light in one or more data files. However, as discussed further below, some objects that are naturally bright, such as a white poster, may cause pixels of the image data to appear overexposed, or saturated, because the pixel data is white.

When light is received by an imaging device it is integrated by an image sensor (e.g., a photosensitive surface with a plurality of pixel sensors provided thereon) of the imaging device having one or more filters associated therewith. Such sensors may detect information regarding aspects of any number of pixels of the reflected light corresponding to one or more base colors (e.g., red, green or blue) of the reflected light, or distances to objects from which the light was reflected. Pixel readout is a result of integrating all absorbed photons of light at all wavelengths. In the discussed imaging devices 108, one of three possible color filters are placed before the sensor element. Each color filter essentially modifies the pixel's sensitivity to each wavelength. For example, a red color filter passes mostly photons in the higher wavelengths, so we may think of it as giving the pixel a high sensitivity to higher wavelengths and a low sensitivity to lower wavelengths, such as blue. As a result of the three different color filters (R, G, B), each pixel includes three radiance values, one for each wavelength sensitivity profile.

The radiance values for each pixel are then converted to final R, G, B intensity values, referred to herein collectively as pixel values. The processing involved in producing the final R, G, B intensity values of a pixel involves translation from a raw pixel radiance to a digital value between 0 and 255. This mapping may be linear or with another shape typically involving a parametric form with an exponent termed gamma. In addition to converting the raw pixel value to digital values, each of the values may be scaled by different amounts to compensate for undesired overall color of the image due to the illumination of the environment. This scaling is generally referred to as white balancing. Other adjustments may likewise be made to the pixel values including adjusting for gain, offset, etc. These adjustments are typically performed by the imaging device to account for the illumination of the environment being imaged and are referred to herein generally as imaging device parameters or camera parameters.

An imaging device that is configured to capture and store visual image data (e.g., color images) is commonly called an RGB ("red-green-blue") imaging device (or camera), while an imaging device that is configured to capture both visual image data and depth image data (e.g., ranges) is commonly referred to as an RGBz or RGBD imaging device (or camera). Image data files may be stored in any number of formats, including but not limited to .JPEG or .JPG files, or Graphics Interchange Format (or ".GIF"), Bitmap (or ".BMP"), Portable Network Graphics (or ".PNG"), Tagged Image File Format (or ".TIFF") files, Audio Video Interleave (or ".AVI"), QuickTime (or ".MOV"), Moving Picture Experts Group (or ".MPG," ".MPEG" or ".MP4") or Windows Media Video (or ".WMV") files.

Many imaging devices also include manual or automatic features for modifying their respective fields of view or orientations. For example, an imaging device may be configured in a fixed position, or with a fixed focal length (e.g., fixed-focus lenses) or angular orientation. Alternatively, an imaging device may include one or more actuated or motorized features for adjusting a position of the imaging device, or for adjusting either the focal length (e.g., a zoom level of the imaging device) or the angular orientation (e.g., the roll angle, the pitch angle or the yaw angle), by causing a change in the distance between the sensor and the lens (e.g., optical zoom lenses or digital zoom lenses), a change in the location of the imaging device, or a change in one or more of the angles defining the angular orientation.

For example, an imaging device may be hard-mounted to a support or mounting that maintains the device in a fixed configuration or angle with respect to one, two or three axes. Alternatively, however, an imaging device may be provided with one or more motors and/or controllers for manually or automatically operating one or more of the components, or for reorienting the axis or direction of the device, i.e., by panning or tilting the device. Panning an imaging device may cause a rotation within a horizontal plane or about a vertical axis (e.g., a yaw), while tilting an imaging device may cause a rotation within a vertical plane or about a horizontal axis (e.g., a pitch). Additionally, an imaging device may be rolled, or rotated about its axis of rotation, and within a plane that is perpendicular to the axis of rotation and substantially parallel to a field of view of the device.

Furthermore, some imaging devices may digitally or electronically adjust an image identified in a field of view, subject to one or more physical or operational constraints. For example, a digital imaging device may virtually stretch or condense the pixels of an image in order to focus or broaden the field of view of the digital imaging device, and also translate one or more portions of images within the field of view. Some imaging devices having optically adjustable focal lengths or axes of orientation are commonly referred to as pan-tilt-zoom (or "PTZ") imaging devices, while imaging devices having digitally or electronically adjustable zooming or translating features are commonly referred to as electronic PTZ (or "ePTZ") imaging devices.

As will be appreciated, different areas 111 within a materials handling facility 100 may experience different lighting conditions. For example, a first area 111-1 of the materials handling facility may have a first set of lighting conditions due to natural light passing through a window, direct light from artificial illumination sources within the materials handling facility 100, and ambient light. In comparison, other areas, such as areas 111-2 and 111-3 that are farther within the interior of the materials handling facility may have different lighting conditions because those areas that do not receive direct natural light and/or because the light from the artificial illumination sources is different. Still further, the geometry of the areas may impact the lighting conditions. For example, areas with large objects (e.g., inventory shelves) may affect how light falls on surfaces within the area and thus, how much light is eventually received by the imaging devices in that area.

Because the position, orientation, etc., of imaging devices may vary over time and because the illumination of the environment being imaged by the imaging device may likewise vary with respect to time, the imaging device parameters may be adjusted to account for the changes. Lighting conditions within a materials handling facility may change for stationary or adjustable imaging devices. For example, as the time of day, position of the sun 105-2, and/or weather conditions change, such as clouds 107 passing between the sun 105-2 and the materials handling facility 100, the lighting conditions within different areas of the materials handling facility may change. For example, direct sunlight may enter a portion of the materials handling facility during certain times of the day. As another example, if an artificial illumination sources 105-1 within the materials handling facility is altered (e.g., dimmed) or one or more of the artificial illumination sources 105-1 is powered off or becomes inoperable, the lighting conditions may change.

As lighting conditions within an area change, or the field of view of an imaging device changes (e.g., the imaging device is moved, rotated, etc.), the imaging device parameters, also referred to herein as camera parameters, are adjusted to account for the changes in the lighting conditions. Likewise, some objects that are within the materials handling facility, such as white objects, markers, highly reflective surfaces, etc., may be recorded as pixel values having only or mostly white values. Such pixel values are difficult to distinguish from overexposed pixel values that are representative of direct sunlight, or other high illumination. As a result, as discussed further below, pixel values representative of these objects may be filtered out or removed from consideration as part of the process for determining whether pixels of the image data represent a portion of the environment that is exposed to high illumination.

Figure 2:
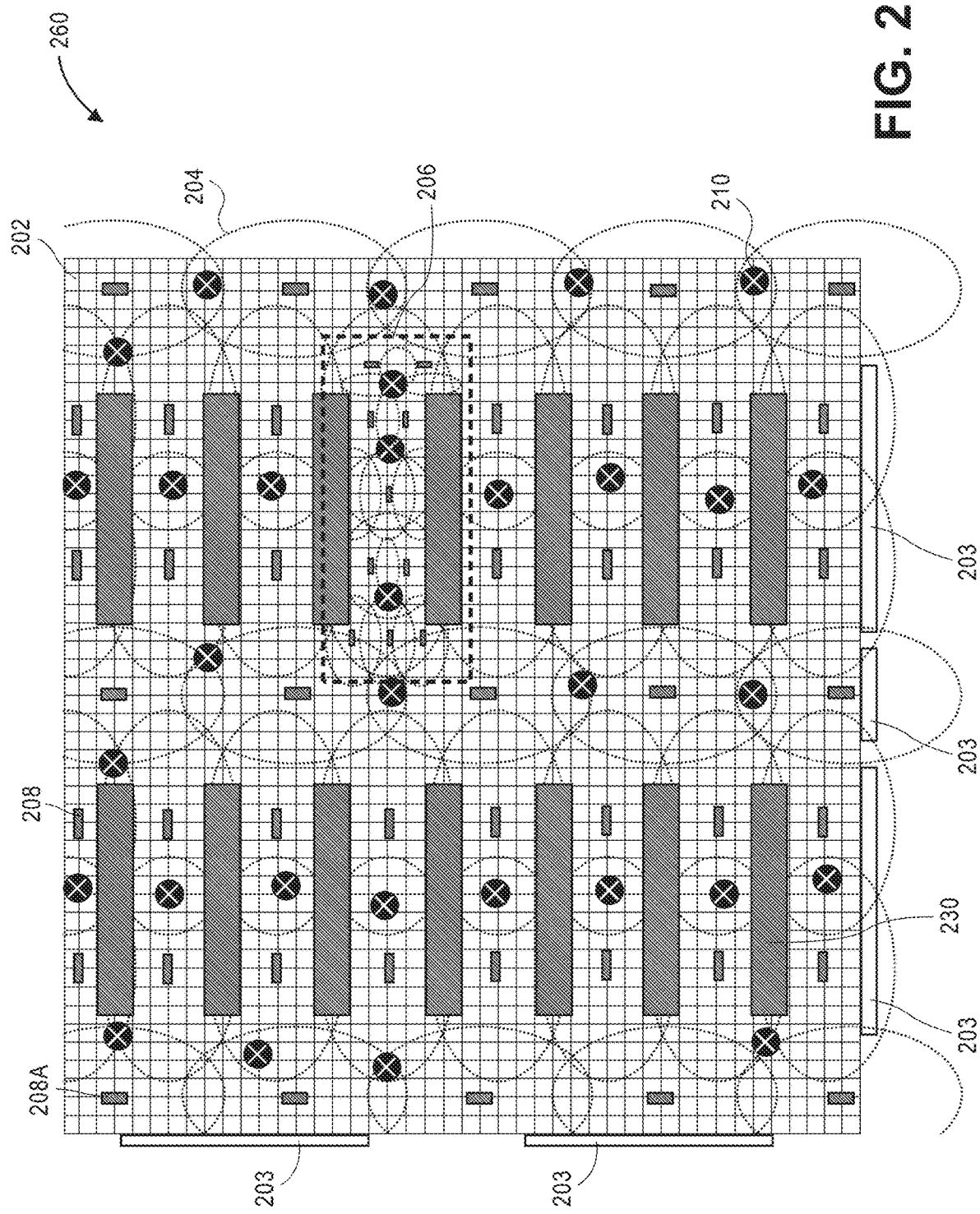
FIG. 2 is a block diagram of an overhead view of a cluster of imaging devices within a materials handling facility, in accordance with described implementations.

FIG. 2 is a block diagram of an overhead view of a cluster 260 of imaging devices within a materials handling facility, in accordance with the described implementations. A cluster may represent a segment of a materials handling facility or all of the materials handling facility. In some implementations, a single materials handling facility may include a plurality of clusters. In other implementations, a single cluster may be used to cover an entire materials handling facility.

Within each cluster 260, a plurality of imaging devices 208 may be positioned overhead (e.g., on a ceiling), referred to herein as overhead imaging devices or overhead cameras, at defined locations so that the collective field of view of the imaging devices covers the entire surface of the portion of the materials handling facility corresponding to the cluster 260. In some implementations, a grid 202 system, physical or virtual, is oriented with the shape of the materials handling facility (e.g., oriented with the walls of the materials handling facility). The grid 202 may be utilized to attach or mount imaging devices within the cluster 260 at defined locations with respect to the physical space of the materials handling facility. For example, in some implementations, the imaging devices may be positioned at any one-foot increment from other imaging devices along the grid.

By mounting the imaging devices overhead at defined locations along the grid, the imaging devices can be associated with physical coordinates, also referred to herein as real-world positions, within the materials handling facility. For example, if the cluster 260 represents the north-west corner of a materials handling facility, the grid 202 may be segmented into columns and rows and imaging devices may be positioned at any point on the grid. The columns and rows may be identified using any nomenclature, such as alphabetical characters for columns and numeric characters for rows. Each column:row intersection is at a defined physical location within the materials handling facility. For example, if the grid is positioned in one foot by one-foot increments, the physical location within the materials handling facility of every grid intersection and any connected imaging devices is known. In this example, imaging device 208A is positioned at grid coordinate B:3, which corresponds to the horizontal coordinate of the imaging device being positioned approximately two feet by three feet from the origin (in this example the upper left corner) of the cluster.

Because the field of view 204 of the imaging devices 208 may not be circular, the imaging devices may be placed at defined directions (e.g., 0, 90, 180, 270 degrees). The direction of the imaging device may be determined based on the field of view 204 coverage of adjacent imaging devices and/or the layout of objects on the surface of the materials handling facility. For example, if the imaging device 208 is being mounted above an aisle between two inventory locations 230, the direction of the imaging device may be set so that the larger portion of the field of view 204 of the imaging device covers the length of the aisle.

The height of the imaging devices from the surface, the distance between imaging device placement and/or direction of the imaging devices 208 within the cluster 260 may vary depending on the layout of the materials handling facility, the lighting conditions in the cluster, the volume of agents expected to pass through a portion of the cluster, the activities and/or volume of activities expected to occur at different locations within the cluster, etc. For example, imaging devices may typically be mounted horizontally every three to four feet in one direction and every four to five feet in another direction along the grid 202 so that the field of view of each imaging device overlaps, as illustrated in FIG. 2.

In some implementations, the height of the imaging devices from the surface and the distance between imaging devices may be set so that their fields of view intersect and begin to overlap approximately seven feet above the surface of the materials handling facility. Positioning the imaging devices so that the fields of view overlap at approximately seven feet will result in the majority of agents and/or other objects being within a field of view of an imaging device at all times. If the field of view of the imaging devices did not overlap until they were approximately three feet above the surface, as an agent moves between the fields of view, the portion of the agent that is taller than approximately three feet would exit one field of view and not enter the next field of view until the agent has moved into that range of the imaging device. As such, a portion of the agent is not detectable as they transition between fields of view. Likewise, by overlapping the fields of view of multiple imaging devices, each of the overlapping imaging devices may capture images that include representations of the agent from slightly different perspectives and/or capture images of markers located within the materials handling facility.

While this example describes overlapping imaging device fields of view at approximately seven feet above the surface of the materials handling facility, in other implementations, the imaging devices may be positioned so that the fields of view begin to overlap at different heights (e.g., six feet, eight feet). Likewise, as discussed further below, in some implementations, imaging devices may be positioned at locations other than overhead and/or may be different orientations or degrees of tilt. For example, some imaging devices of the cluster 260 may be mounted on the sides of inventory locations 230 and have a field of view that is substantially perpendicular to the field of view of other imaging devices of the cluster 260.

In some areas of the cluster, such as cluster area 206, imaging devices 208 may be positioned closer together and/or closer to the surface area, thereby reducing their field of view, increasing the amount of field of view overlap, and/or increasing the amount of coverage for the area. Increasing imaging device density may be desirable in areas where there is a high volume of activity (e.g., item picks, item places, agent dwell time), high traffic areas, high value items, poor lighting conditions, etc. By increasing the amount of coverage, the image data increases and/or the amount of field of view overlaps increases, thereby increasing the likelihood that an activity or action will be properly determined.

In some implementations, one or more markers 210 may be positioned throughout the cluster and used with the implementations discussed herein to determine imaging device position and/or determine imaging device parameters of the imaging devices 208. The markers 210 may be placed at any location within the cluster, may be stationary, mobile, permanent, or temporary. In some implementations, the markers 210 may be placed on the surface of the materials handling facility. In other implementations, the markers 210 may be placed on a visible surface of an inventory location 230 within the cluster. In still other implementations, portions of the inventory location 230 itself may be utilized as a marker. Alternatively, or in addition thereto, one or more inventory items that are viewable by the imaging devices may be used as a marker 210. In still other examples, the surface of the materials handling facility may have a detectable pattern, marks, defects, etc., that can be determined and used as markers 210. In general, the markers may be any identifiable object and may be a portion of an inventory location, a mark of the surface of the materials handling facility, a portion of an agent (e.g., a hat, shirt), a machine (e.g., forklift), an item, etc.

Figure 3:
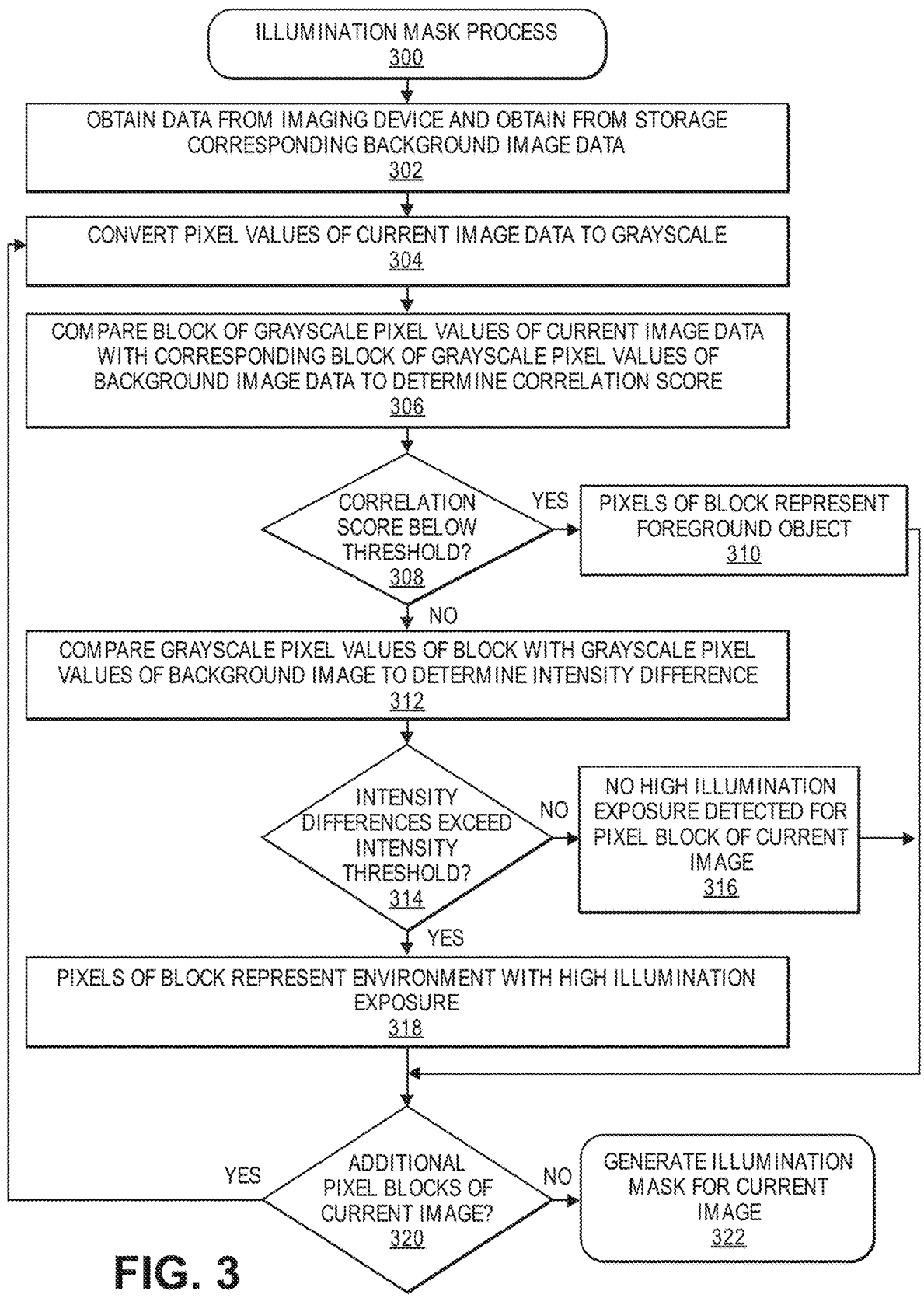
FIG. 3 is a flow diagram of an example unified illumination map process, in accordance with described implementations.

FIG. 3 is a flow diagram of an example illumination detection process 300, in accordance with described implementations. The example process 300 may be performed by computing components local to or included in each of the imaging devices or may be performed by one or more computing components or computing systems that are independent of the imaging devices that receive image data from the imaging devices.

The example process 300 begins by obtaining or receiving image data from an imaging device and also obtaining, from a data store, background image data, as in 302. The background image data may be image data generated by the imaging device at a defined period of time under known conditions. For example, the background image data may be generated by the imaging device when it is known that there are no agents located in the field of view of the imaging device and when it is known that there is no unexpected illumination (e.g., sunlight) projecting onto the environment that is within the field of view of the imaging device. In some implementations, the background image data may be periodically generated at defined periods of time to update and account for changes in objects within the field of view of the imaging device. For example, the background image data may be generated everyday at 03:00 hours when there is no sunlight potentially projecting into the field of view of the imaging device and there are no agents located in the field of view of the imaging device.

In some implementations, the background image data is converted and stored as grayscale image data in a datastore that is accessible to or controlled by an inventory management system (discussed below) and/or stored in a memory of the imaging device. Conversion of color image data to grayscale is a technique known in the art. In other implementations, the imaging device may be a monochrome imaging device such that the image data does not need to be converted to grayscale.

Similar to the background image data, the example process may convert pixel data of the current image data received from the imaging device from one color space, such as RGB, to grayscale, as in 304.

Figure 4:
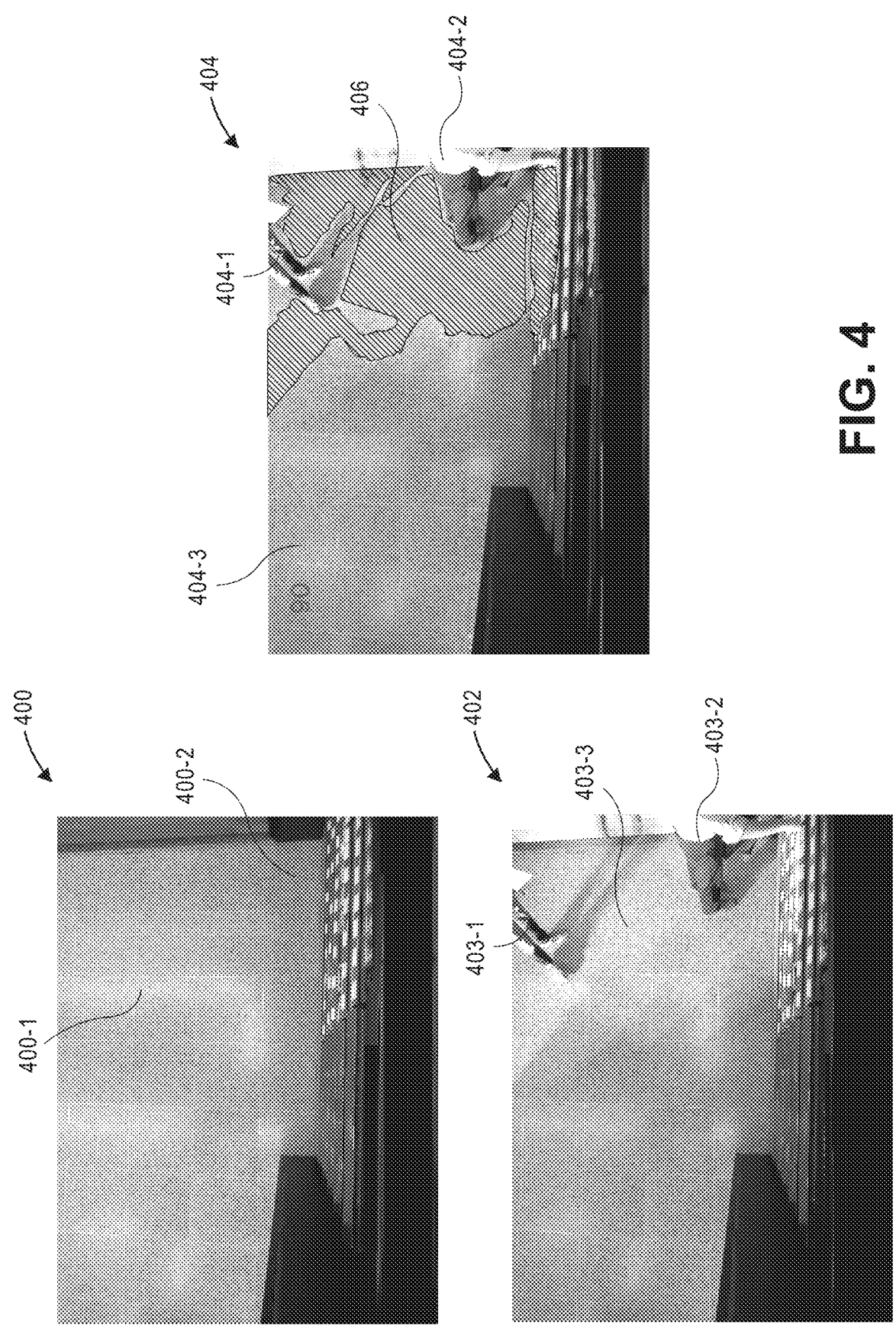
FIG. 4 illustrates example images used to produce an illumination mask, in accordance with described implementations.

Referring to FIG. 4, illustrated is a current image 402 and a background image 400 generated by an imaging device, in accordance with described implementations. As illustrated, both the foreground image 402 and the background image 400 are converted to grayscale. The background image data 402 is generated under known conditions when there are no foreground objects and no unexpected illumination. In this example, illumination 400-1 for lights within the materials handling facility can be seen in the background image data as having a higher intensity than other areas of the environment, such as area 400-2, that do not have as high an intensity. In comparison, the current image 402 is generated by the imaging device in real time or near real time under different lighting conditions 403-3 and when foreground objects, such as agents 403-1 and 403-2 may be within the field of view of the imaging device.

Returning to FIG. 3, pixel values of current image data may be compared with corresponding pixel values of the background image data to determine a correlation score, as in 306. For example, pixel data for a group or block of pixels of the current image data may be utilized to form a feature vector representative of the block of pixels of the current image data. Likewise, pixel data for corresponding group or block of pixels of the background image data may likewise be utilized to form a feature vector representative of the block of pixels of the background image data. A group or block of pixels may be any number of adjacent pixels (e.g., 6×6, 10×10, etc.). When comparing background image data, such as background image data of background image 400 (FIG. 4) with current image data, such as current image data of current image 402, pixels of the current image data correspond with pixels of the background image data because both sets of image data are generated by the same imaging device, and will thus have a high correlation score. Because the imaging device is at a fixed position, or aligned based on markers, or otherwise, pixels from different images will correspond to the same physical position or coordinate within the area viewed by the imaging device, as discussed above.

By generating feature vectors representative of blocks of pixels from the current image data and the background image data, the feature vectors may be compared to determine a correlation score indicating an alignment of the two feature vectors. For example, if there are no foreground objects (e.g., agents) represented in the current image data, the feature vector representative of a block of pixels of the current image data will be highly correlated with a feature vector representative of a corresponding block of pixels from the background image data and have a high correlation score. Specifically, both feature vectors will have approximately parallel projections or alignments.

Use of groups or blocks of pixels provides a computationally lightweight process for detecting pixels that potentially represent foreground objects (i.e., objects represented in the current image data that are not present in the background image data). For example, if only a lighting change has occurred, the overall color or differences between the pixels will remain consistent, just the intensity of the pixel values will increase. In comparison, if an object is represented by the block of pixels of the current image data, the color values of the block of pixels of the image data will be different than the color values of the corresponding block of pixels from the background image data. In such an instance, the projection or alignment of the current feature vector will be different than the background feature vector and the result will be a low correlation score.

Returning to FIG. 3, a determination is then made as to whether the correlation score between the block of pixels of the current image data and the corresponding block of pixels of the background image data is below a correlation threshold, as in 308. As with other thresholds discussed herein, the correlation threshold may be different for different imaging devices, different locations, different blocks of pixels within image data, vary based on the time of day, of week, etc.

If it is determined that the correlation is below the correlation threshold, the block of pixels of the current image data are indicated as representing a foreground object, as in 310. In such an implementation, an illumination mask for the image data may not include information or data corresponding to the block of pixels. Referring again to FIG. 4, when comparing blocks of pixels of the current image 402 with blocks of pixels of the background image 400, it will be determined for blocks of pixels that represent the agents 403-1 and 403-2 that are present in the current image 400-2 but not present in the background image 400, that the correlation score is below the correlation threshold and thus, there is a foreground object represented by that block of pixels in the foreground image data. As discussed further below, for pixels representative of a foreground object, it cannot be consistently determined whether the pixels represent objects that are exposed to a high illumination because it is unknown what clothing or other features of the foreground object exist. For example, the agent 403-2 is wearing a white shirt, which may otherwise be determined to represent a portion of the agent that is exposed to a high illumination.

In comparison to foreground objects, the pixels corresponding to the brightly illuminated floor 403-3 will not be determined to represent a foreground object. Specifically, even though the intensity of the illumination of the pixels of the floor in the current image are high, the overall image data remains consistent for those blocks of pixels. As a result, the feature vector for those blocks of pixels will project in approximately the same direction as the feature vector for the corresponding blocks of pixels of the background image data.

Returning to FIG. 3, if it is determined that the correlation score is not below the correlation threshold, the pixel values of the block of pixels are compared to corresponding pixel values of the background image data to determine an intensity difference, as in 312. As discussed above, even though a foreground object may not be present, the intensity of image data represented by the block of pixels may change if the illumination characteristics change. For example, if sunlight is projected into a portion of the field of view of the imaging device corresponding to the block of pixels, the intensity of the pixel data will be different compared to the corresponding pixel values of the background image data.

However, as also discussed above, the projection of the projection vector of the pixels of the block from the current image data will be approximately aligned with the projection vector of the corresponding pixels of the background image data. For example, as illustrated in FIG. 4, the high illumination area 403-3, which, in this example is the result of sunlight projected onto the floor of the environment, will produce a feature vector with a higher intensity but similar direction than the corresponding pixels in the background image 400.

Upon determination of the intensity difference, a determination is then made as to whether the intensity difference exceeds an intensity threshold, as in 314. Like the other thresholds discussed herein, the intensity threshold may vary based on one or more factors, including, but not limited to, the time of day, day of week, location or orientation of the image data, etc. If it is determined that the intensity difference does not exceed the intensity threshold for the block of pixels, it is determined that the block of pixels of the current image data do not represent a portion of the environment that is exposed to high illumination, as in 316. In comparison, if it is determined that the intensity difference does exceed the intensity threshold, it is determined for the block of pixels of the current image data that each of those pixels represent a portion of the environment that is exposed to high illumination, as in 318. Utilizing an intensity threshold allows for some variation in illumination among a block of pixels without determining those pixels to represent a portion of the environment exposed to high illumination.

After determining if the block of pixels represent a portion of the environment that is exposed to high illumination, a determination is made as to whether additional blocks of pixels of the current image data are to be processed, as in 320. If additional blocks of image data are to be processed, the example process returns to block 304 and continues. However, if it is determined that all blocks of pixels of the current image data have been processed, an illumination mask for the image data is generated, as in 322. An illumination mask includes an indication for each pixel of the image data whether the pixel does or does not represent a portion of the environment that is exposed to a high illumination (e.g., sunlight) or whether it cannot be determined whether the pixel represents a portion of the environment exposed to a high illumination. For example, if an illumination change is determined for a block of pixels of the current image data, the illumination mask will indicate for each pixel of those blocks of pixels that the pixel represents a portion of the environment that is exposed to a high illumination. In comparison, if it is determined for a block of pixels of the current image data that there is no change in illumination for the block of pixels, the illumination mask will include, for each pixel of the block of pixels, that those pixels represent a portion of the environment that is not exposed to a high illumination. Finally, if it is determined for a block of pixels of a current image data that those pixels represent a foreground object, the illumination mask will indicate for each pixel of those blocks of pixels that it is unknown whether the pixels do or do not represent a portion of the environment that is exposed to high illumination.

Referring again to FIG. 4, image 404 is the current image with the illumination mask 406 overlaid on the current image 404 to indicate pixels of the current image that are determined to represent portions of the environment that are exposed to high illumination. In this example, because blocks of pixels corresponding to the portion of the floor 404-3 are determined to be highly correlated with the pixels of the background image 400, the illumination mask does not indicate those pixels as representative of a portion of the image exposed to high illumination. Likewise, because the blocks of pixels corresponding to the foreground objects 404-1, 404-2 are indicated as undetermined as to whether they do or do not represent portions of the environment exposed to high illumination, the foreground mask does not alter or otherwise flag those pixels. Finally, because the blocks of pixels 404-3 of the current image corresponding to the portion of the floor onto which a high illumination is projected and therefore have a high intensity difference when compared with the corresponding pixels of the background image 400, the pixels are represented as the hashed lines 406 of the illumination mask to indicate the pixels as representative of a portion of the environment exposed to high illumination.

As will be appreciated, the visible illustration of the foreground mask 406 is provided for explanation purposes only. In other implementations, the foreground mask may be represented as data with different symbols or other identifiers indicating whether the pixels have been determined to represent a portion of an environment that is exposed to high illumination, not exposed to high illumination, or whether it is unknown as to whether the pixel is exposed to high illumination.

Figure 5:
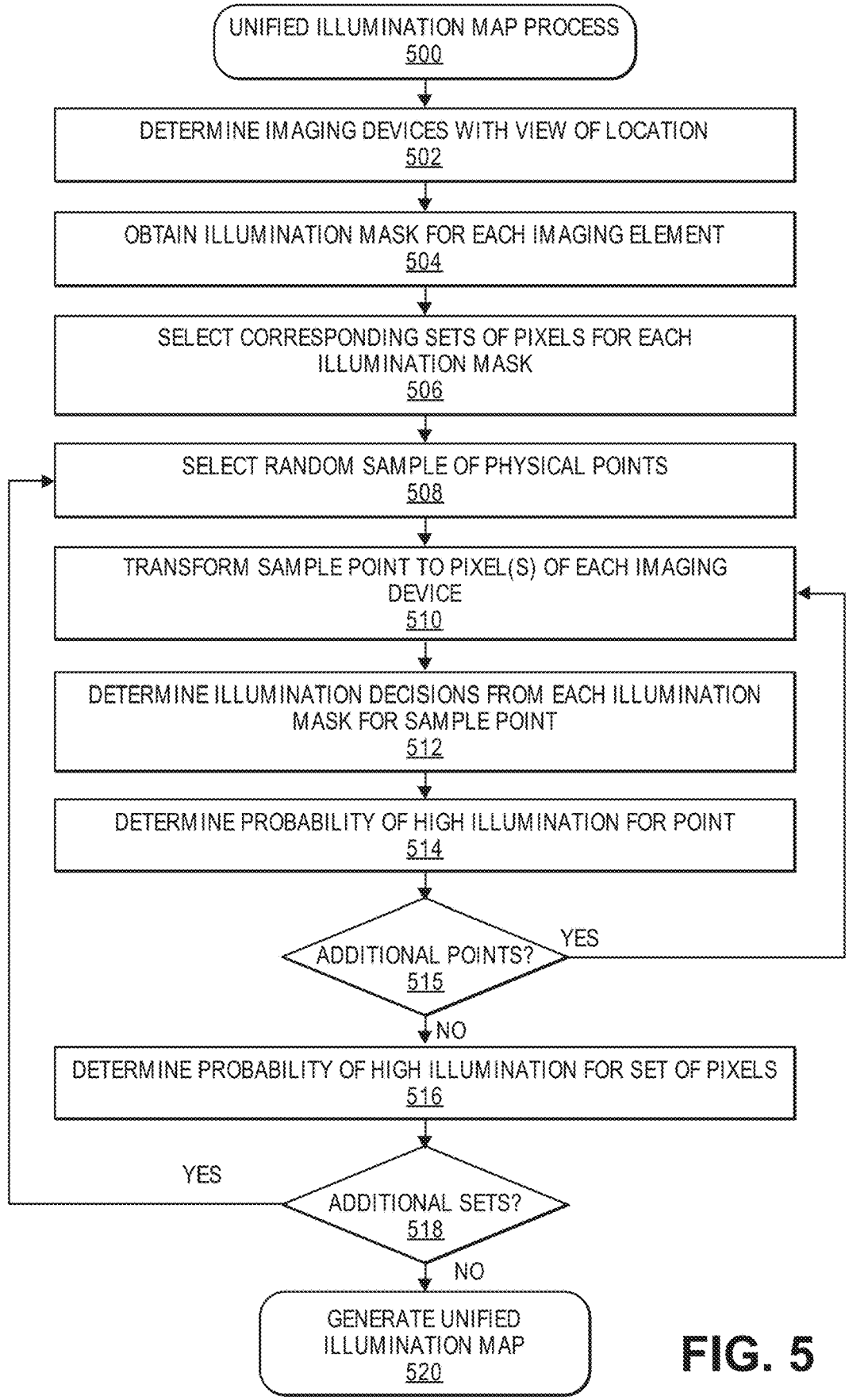
FIG. 5 is a flow diagram of an example unified illumination map process, in accordance with described implementations.

FIG. 5 is a flow diagram of an example unified illumination map process 500, in accordance with described implementations. The example process 500 begins by determining imaging devices with a view of the location for which a unified illumination map is to be generated, as in 502. As discussed above, multiple imaging devices may be positioned to have overlapping fields of view and pixels of those fields of view are aligned and associated with physical coordinates within the materials handling facility. In some implementations, only two imaging devices may cover a particular portion of an environment. In other implementations, numerous (e.g., 10, 15, 20) imaging devices may having overlapping fields of view such that each of those imaging devices has a view of a location (such as an inventory location) within the environment.

For each determined imaging device, an illumination mask corresponding to the location is obtained, as in 504. Generation of an illumination mask is discussed above. In the example illustration, the illumination masks may be generated in real time, or near real time and provided to the example process 500. In other implementations, illumination masks may be generated upon detection of an event or other activity within a view of a respective imaging device.

As discussed above, because the imaging devices are at fixed positions and calibrated, or otherwise aligned if the imaging devices are movable, pixels of each illumination mask are aligned such that sets of pixels for each illumination mask may be selected that represent the same physical area within the field of view of those imaging devices, as in 506. In some implementations, the set of pixels selected for each illumination mask may be a defined shape or number of pixels (e.g., 6×6, 10×10 grid of pixels).

For the set of pixels, one or more random physical points represented by the sets of pixels are selected, as in 508. Any number of random points may be selected. For example, in some implementations thirty random physical points corresponding to the represented sets of pixels may be selected. In other implementations, fewer or additional random points may be selected. In addition, physical coordinates of random positions within the environment may be selected as the points. In other implementations, random pixels from the sets of pixels may be selected as the points and pixels.

For a selected physical point of the randomly selected physical points, a determination is made as to how many of the number of illumination devices have a view of that selected point, as in 510. Because the imaging devices are at different positions and there may be objects or other obstacles within the field of view of some of those imaging devices, a selected physical point may not be viewable by each of those imaging devices. For example, if there are nine imaging devices that include a view of an inventory location, it may be determined that only five of those nine imaging devices have a view of a particular selected physical point and the other four have views that are blocked or occluded such that they do not have a view of the selected point.

Determining whether an imaging device can view one of the physical points may be accomplished using one or more of a variety of techniques. For example, a distance between the physical point and each of the imaging devices may be known and if the distance associated with pixel of the imaging device does not correspond to the known distance, it can be determined that the physical point is not within a view of the imaging device. In another example, the physical point may correspond to a known background object (e.g., floor, shelf, or other plane). A transformation between the physical point on the plane and the information received from the imaging device may be computed and utilized to determine if the imaging device has a view of the physical point. In other implementations, other techniques may be utilized.

For each of the imaging device that is determined to have a view of the selected point, a determination is made, based on the illumination masks, whether the pixels representative of that selected point represent a portion of the environment that is exposed to a high illumination, as in 512.

Based on the number of imaging devices that can view the point within the set of pixels and the number of illumination masks that indicate those pixels represent a portion of the imaging device that is exposed to a high illumination, a probability of high illumination is determined for that point of the randomly selected sample points, as in 514. For example, if there are five imaging devices that have a view of a randomly selected point and illumination masks for three of those imaging devices indicate that the pixels representative of the selected point represent a portion of the environment that is exposed to high illumination, it will be determined that there is a 60% probability that the selected physical point is exposed to high illumination.

A determination is then made as to whether there are other points of the randomly selected points within the set for which an illumination probability is to be determined, as in 515. If it is determined that there are additional points for which an illumination probability is to be determined, the example process returns to block, 510 and continues for a next point of the randomly selected points. If it is determined that an illumination probability has been determined for all points of the randomly selected points within the set, a probability of high illumination is determined for the set of pixels, as in 516. The probability of high illumination may be, for example, an average, weighted average, median, etc., of the illumination probabilities determined for each of the randomly selected points. In another example, the probability of high illumination may be the highest illumination probability determined for the randomly selected points.

A determination may then be made as to whether there are additional sets of pixels to process, as in 518. If it is determined that there are additional sets of image data to process, the example process 500 returns to block 508 and continues. If it is determined that there are no additional sets to process, the example process 500 generates a unified illumination map, as in 520. The unified illumination map may include a pixelated view indicating probabilities that different sets of pixels represent portions of the environment exposed to high illumination.

In some implementations, the illumination map may be published or provided to one or more other systems or services to indicate pixels of image data generated by the imaging devices that represent portions of the environment that are exposed to high illumination (e.g., sunlight). The other systems or services may utilize the illumination map to perform one or more actions and/or to alter one or more algorithms that utilize image data. For example, the unified illumination map may be utilized by one service to automate the opening or closing of window blinds to block or control light projecting into the materials handling facility. In other implementations, one or more item tracking systems or agent tracking systems may utilize the unified illumination map to alter an algorithm to not consider pixels of images determined to represent a portion of the environment exposed to high illumination. For example, if it is determined that an inventory shelf is exposed to high illumination, the inventory tracking system may not consider imaging data representative of that inventory shelf (or reduce a weight of information determined from the image data) in determining whether an item has been picked from the inventory shelf.

Figure 6:
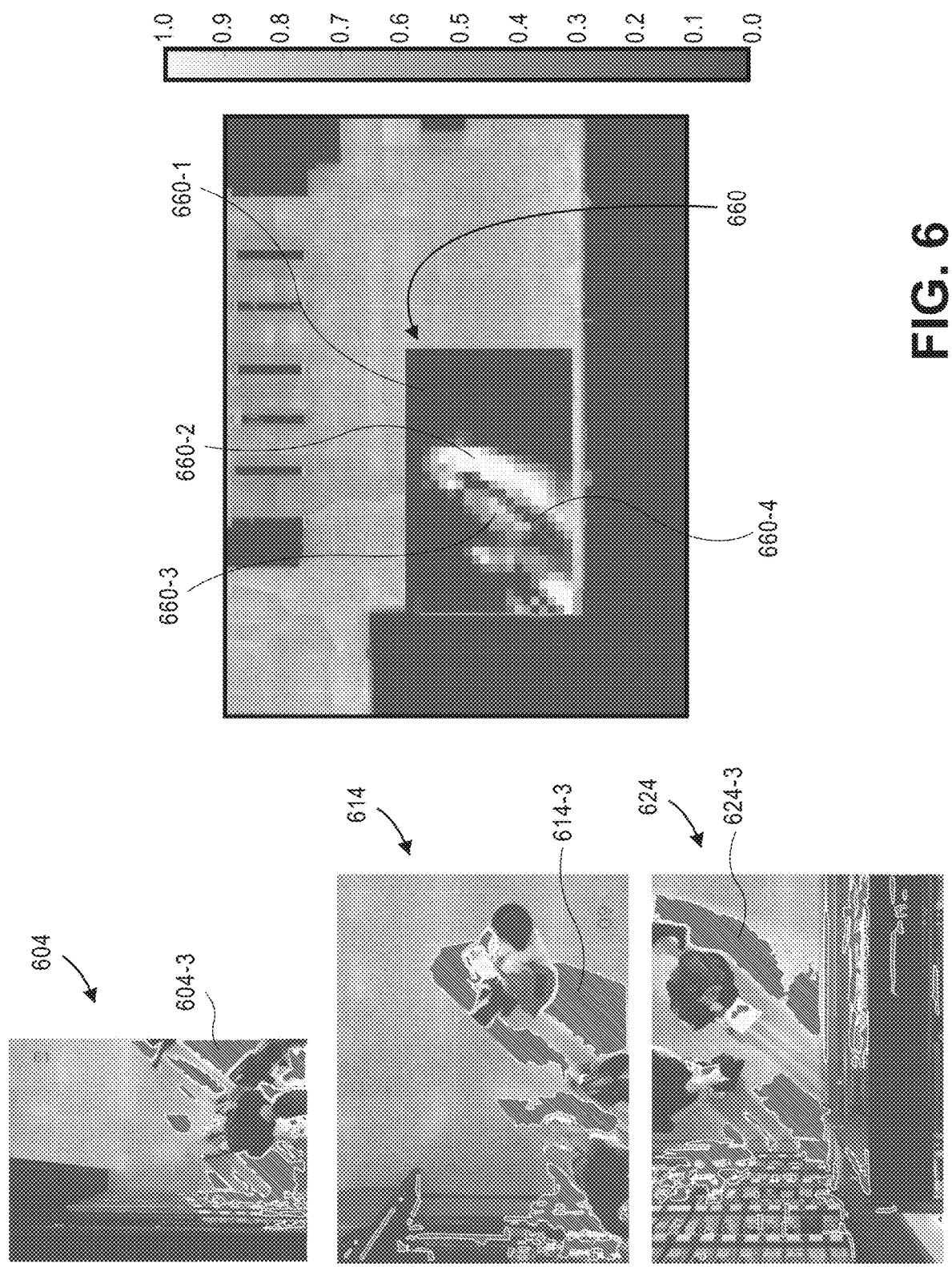
FIG. 6 illustrates example illumination masks used to produce a unified illumination map, in accordance with described implementations.

FIG. 6 illustrates illumination masks 604, 614, and 624 used to produce a unified illumination map 660, in accordance with described implementations. In this example, each of the illumination masks 604, 614, and 624, which for purposes of explanation are presented with the corresponding image data, may be generated using one or more of the implementations discussed above. In this example, the first illumination mask 604 is representative of an inventory location from a first view of a first imaging device. The second illumination mask 614 is representative of the inventory location from a second view of a second imaging device. The third illumination mask 624 is representative of the inventory location from a third view of a third imaging device.

Because each of the imaging devices that generate the illumination masks 604, 614, and 624 have different views of the inventory area, the pixels of the respective image data determined to represent portions of the inventory area exposed to high illumination may be different. For example, the portions 604-3, 614-3, and 624-3 identify different portions of the inventory area that are each determined to be exposed to high illumination.

Utilizing the implementation discussed above with respect to FIG. 5, sets of pixels from each of the illumination maps 604, 614, 624 are obtained, sample points within each of those sets of pixels are determined, and a probability that the pixels of the sets are representative of a portion of the inventory area that is exposed to high illumination are determined. Finally, a unified illumination map 660 is generated that pixelates the image data, according to the sets of pixels, to illustrate for the sets of pixels the determined probabilities. As can be seen, it is determined with a high probability that the sets of pixels along the area 660-2 are representative of objects within the materials handling facility that are exposed to a high illumination. It is determined that the area 600-2 has a high probability because the image data from each of the cameras with a view of that area 660-2 include an indication that the pixels of the area represent a portion of the inventory location that is exposed to a high illumination, as can be seen by areas 604-3, 614-3, and 624-3. There is a medium probability for the area 660-3 because some of the illumination masks indicate the area as including pixels representative of a portion of the inventory location exposed to high illumination, and some of the illumination masks indicate that the pixels representative of the area are not representative of a portion of the inventory area exposed to high illumination. Still further areas 660-1 and 660-4 are indicated to have a very low probability of including pixels representative of portions of the inventory area exposed to high illumination. In this example, the floor area 660-1 is determined to have a low probability because none of the illumination masks 604, 614, 624 include indications that the pixels corresponding to that area are representative of portions of the inventory location that are exposed to high illumination. Likewise, the area 660-4 that is shadowed by an agent is determined to have a low probability of including pixels that is representative of a portion of the inventory area that are exposed to a high illumination.

By generating unified illumination maps using illumination masks from multiple imaging devices, a more accurate representation of an area of an environment can be determined. As discussed above, because the positions of different imaging devices result in different views of an area, and different lighting conditions, it is beneficial to combine that information to determine a probability as to whether portions of the area are exposed to a high illumination, such as sunlight and/or another excessive lighting change. Determining whether portions of an environment, such as an inventory location, are exposed to high illumination is important to improve the accuracy of other algorithms, systems, or services that rely on image data that includes pixels representative of that portion of the environment. As discussed above, high illumination of an area may result in pixels representative of that portion of the environment to be oversaturated with light and thus not include image data representative of the portion of the environment corresponding to those pixels. Such lack of data may result in inaccurate processing of the image data. For example, without the disclosed implementations, an inventory management system may inaccurately determine that an inventory item has been picked from a shelf if that inventory item is exposed to a high illumination such that there is no image data representative of the inventory item in the image data. Detecting the areas that are exposed to high illumination provides the ability to alert or notify relevant systems that the image data should be disregarded or given a lesser weight. Accordingly, determining portions of an environment that are exposed to high illumination provides a technical benefit in the automation and processing of image data representative of those areas and improves the accuracy of many systems or services that rely on that data.

As discussed above, because information about foreground objects that may be present in image data may not be known, the above described implementations do not determine whether foreground objects represented in image data are exposed to high illumination. The following implementations discuss determining a direction of projected illumination, such as sunlight, and using that information to determine whether portions of foreground objects represented in image data are exposed to high illumination. In some implementations, the determination of the direction of the projected illumination and whether foreground objects are exposed to a portion of that projected illumination may be determined based on a combination of processing current image data from one or more imaging devices and simulation of an environment and projections of illumination within that simulated environment.

Figure 7:
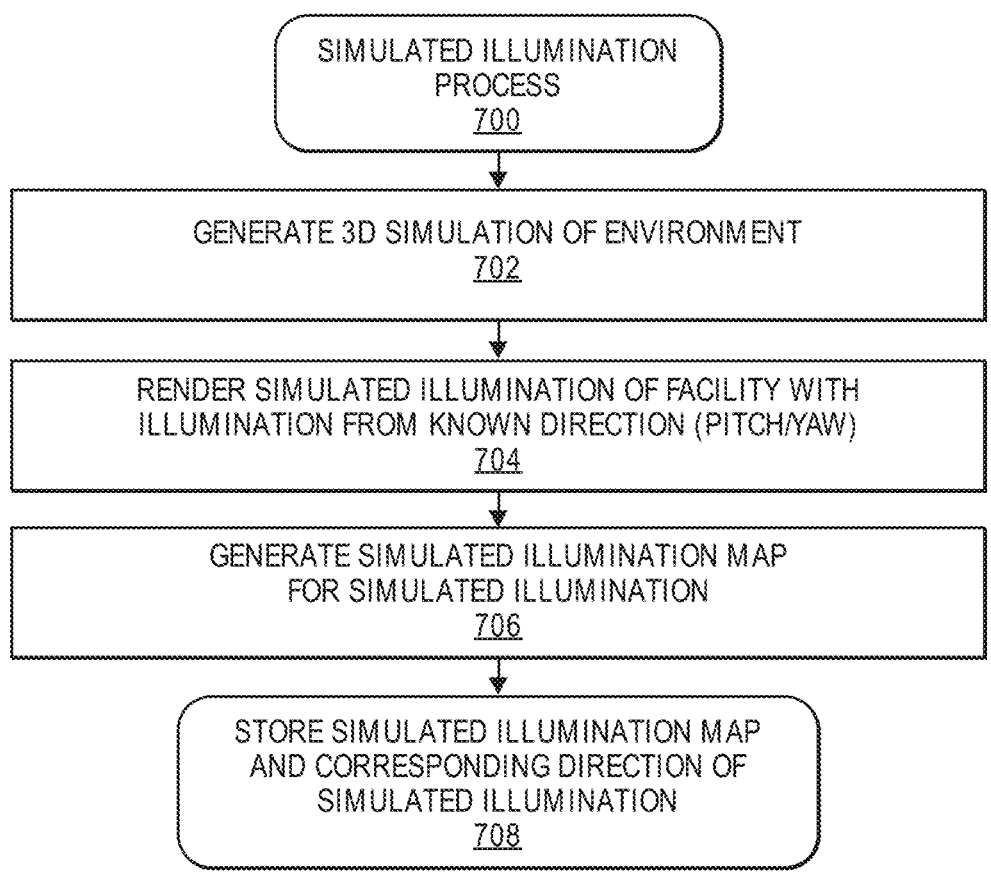
FIG. 7 is a flow diagram of an example simulated illumination process, in accordance with described implementations.

FIG. 7 is a flow diagram of a simulated illumination process 700, in accordance with described implementations. The example process 700 may be performed any number of times using a variety of illumination directions to generate simulated illumination masks of an environment, such as a materials handling facility. For example, in some implementations, millions of simulated illumination masks may be generated according to the example process 700 for a materials handling facility, with each simulated illumination mask corresponding to a different illumination direction.

The example process 700 begins by generating a simulation of an environment, such as a materials handling facility, as in 702. Any one or more of a number of three-dimensional modeling systems, such as Blender, may be utilized to generate a simulation of the environment. Simulation of the environment may include, for example, simulating each position of known objects within the environment (background objects) walls, ceiling, etc., as well as simulating the position, orientation, and field of view of each imaging device within the environment.

For the simulated environment, a simulated illumination of the environment is rendered with an illumination source from a known direction (pitch $\Psi$ and yaw $\Theta$) and distance from a center of the simulated environment, as in 704. A simulated field of view of each of the imaging devices within the simulated environment are then recorded as simulated image data and processed to generate simulated illumination maps, as in 706. Processing of the simulated image data to determine simulated illumination map for the imaging device based on the projected illumination and may be determined based on values of position information recorded in the simulation. Because the area is simulated, and the illumination is simulated, the simulation provides known information as to what portions of the simulated environment are exposed to the simulated illumination.

Finally, the simulated illumination maps are associated with the known directions of the illumination and stored in a data store, as in 708. As noted above, the example process 700 may be performed any number of times and for any number of positions of the simulated illumination source to generate simulated illumination masks under essentially all illumination conditions. Likewise, in some implementations, the simulations may also be done with the simulated illumination at different intensities.

Figure 8:
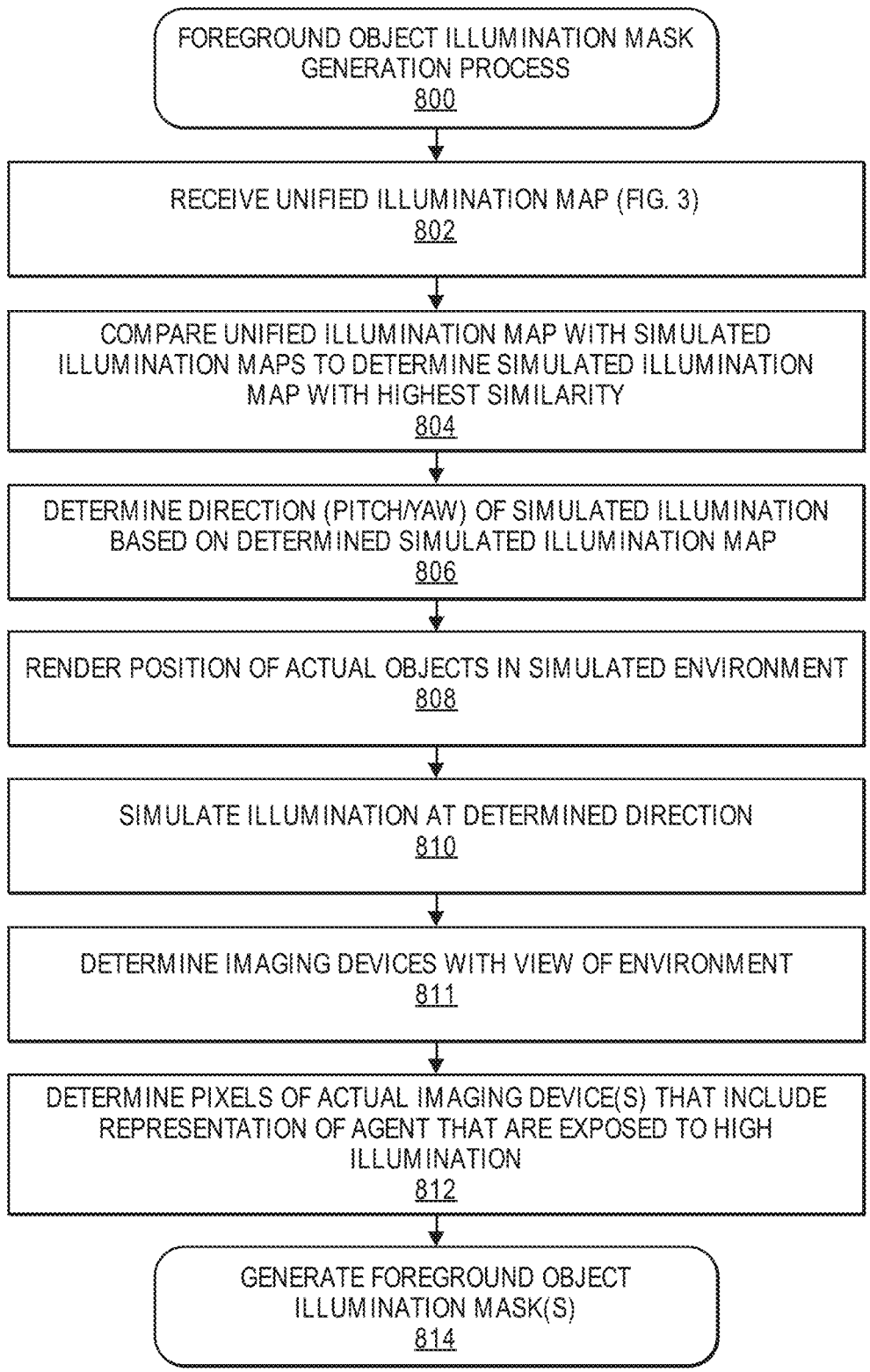
FIG. 8 is a flow diagram of an example foreground object illumination mask process, in accordance with described implementations.

FIG. 8 is a flow diagram of an example foreground object illumination mask generation process 800, in accordance with described implementations. In this example, a unified illumination map corresponding to image data representative of an environment, such as an inventory location within a materials handling facility is received, as in 802. The unified illumination map may be generated as discussed above with respect to the example process 300 and indicate pixels of the image data representative of a portion of the environment exposed to high illumination. However, as discussed above, if one or more foreground objects are detected in the image data, a determination will not be made by the example process 300 as to whether the pixels representative of the foreground object represent a portion of the environment exposed to high illumination.

In the example process 800, the unified illumination map is compared with a plurality of the stored simulated illumination maps to determine a simulated illumination map that has a highest similarity with the unified illumination map, as in 804. In one example, the unified illumination map is input into a light-source direction predictor that utilizes the unified illumination map and simulated illumination maps to determine a direction of the light source. For example, pixel values of the unified illumination map may be compared with corresponding pixel values of the simulated illumination maps to determine respective similarity scores and the simulated illumination map having the highest similarity score may be selected. In other implementations, a nearest-neighbor approach may be conducted to determine a simulated illumination map having a highest similarity to the unified illumination map. As still another example, a generalized Jaccard similarity and distance measure may be utilized to compare simulated illumination maps with the received unified illumination map to determine a simulated illumination mask having a highest similarity. In still other example, other regression or machine learning approaches may be utilized to compare a unified illumination map with stored simulated illumination maps to determine the stored simulated illumination map that has a highest similarity with the unified illumination map. For example, a neural network may be trained utilizing simulated illumination maps and associated pitch and yaw values. Once trained, the neural network can receive a unified illumination map, adjust weighting values, and determine direction (pitch, yaw) that corresponds to the unified illumination map. In such an implementation, once the neural network is trained, the simulated illumination maps may be discarded, and the trained network can be utilized to determine direction for a unified illumination map.

Upon determination of the simulated illumination map having the highest similarity, the known direction (pitch and yaw) of the simulated illumination corresponding to the determined simulated illumination map is determined, as in 806. As discussed above, the direction of the simulated illumination is associated and stored with each of the simulated illumination maps.

Next, positions of foreground objects, such as agents are rendered at the respective positions in a simulation of the environment, as in 808. For example, the position, size, shape, etc., of foreground objects represented in the image data may be determined from the image data and utilized to render simulations of those foreground objects in the simulated environment. In some implementations, the image data may include depth information and/or coordinate information indicating the size, shape and/or position of the foreground objects represented by pixels of the image data.

Subsequent to rendering the foreground objects in the simulated environment, illumination of the environment with an illumination from the known direction is performed, as in 810. The simulated illumination of the environment with the rendered simulations of foreground objects identifies the pixels of those foreground objects representative of a portion of the environment exposed to high illumination. Specifically, because the pixel values of the simulated environment are known, and the simulated illumination is projected from a known direction, it can be determined which pixels of the simulation will represent a portion of the environment exposed to illumination.

The example process 800 then determines each imaging device that has a view of the simulated portion of the environment, as in 811. As discussed above, the position, orientation, and field of view of each imaging device within the environment is known and that information may be utilized to determine which imaging device have a view of the portion of the environment that has been simulated and for which it is determined there is high illumination.

Because the simulation is aligned with the actual imaging device and thus the simulated illumination and the image data are aligned, it may be determined whether the pixel values of the image data from one or more of those imaging devices are representative of a portion of the environment exposed to a high illumination, as in 812. Based on the determination, the unified illumination map may be updated to indicate for the pixels representative of the foreground objects whether those objects are representative of a portion of the environment that is exposed to high illumination. Alternatively, or in addition thereto, a foreground object illumination mask may be generated for each of the determined imaging devices, the illumination masks indicating, for each pixel of the image data corresponding to the foreground objects, whether the pixel is representative of a portion of the environment that is exposed to high illumination, as in 814.

The foreground object illumination mask generated for each imaging device may be published, sent, or otherwise made available to one or more systems or services to indicate to those systems or services image data corresponding to the foreground objects that are representative of a portion of the environment that is exposed to high illumination. For example, a foreground object illumination mask for a first imaging device may be provided to an agent tracking service indicating pixels of the image data received from that first imaging device corresponding to the object should not be considered in tracking the agent (i.e., because those pixels are determined to represent a portion of the environment that is exposed to high illumination).

FIG. 9 illustrates a current image 900 of an environment, a corresponding simulated image 902 of the environment, and a resulting foreground object illumination mask of the environment 904, in accordance with described implementations. As illustrated in the image 900, which is represented in grayscale, there are foreground objects, such as agent 903. As can be seen, a portion of the environment is exposed to high illumination. For example, a portion of the inventory location 905 and a lower portion of the agent 903-2 are represented by pixels having a much higher intensity value compared to other pixels of the image data 900.

One or more of the implementations discussed herein may be used to generate a unified illumination map representative of the environment illustrated in FIG. 9. Utilizing the unified illumination map, a corresponding simulated illumination map is selected in which the illumination from a simulated illumination source has a highest similarity to the illumination represented in the image 900. In addition, the size, shape, and position of the foreground objects, such as the agent 903, are determined and simulated foreground objects are rendered in the simulated environment. Finally, the simulated environment, with the simulated foreground objects, is illuminated with a simulated illumination, as illustrated by the simulated image 902. Simulated image 902 can be used to determine that the lower portion of the agent 902-2/903-2 is represented by pixels representative of a portion of the environment exposed to high illumination. In comparison, it is determined that an upper portion 902-1/903-1 of the agent 903 is not represented by image data representative of a portion of the environment that is exposed to high illumination. Similarly, it may be determined that other foreground objects 907, 908 are also not represented by pixels representative of objects within the environment exposed to high illumination.

Utilizing the simulated illumination of the environment, a foreground object illumination mask may be generated for each imaging device that has a view of the environment. For example, each of the pyramids 905 represented in the simulation 902 may correspond to a position and orientation of view of imaging devices that have a view of the environment. In this example, imaging device 905-1 is selected and, based on the simulated information that includes the simulated foreground objects and the simulated illumination, a foreground object illumination mask 904 is generated that indicates pixels of image data produced by imaging device 905-1 that are representative of a foreground object that is exposed to high illumination. In this example, the foreground object illumination mask 904 indicates that pixels 904-1 that are representative of the lower portion 902-2/903-2 of the agent 903 correspond to a portion of the agent 903 that is exposed to high illumination. Likewise, the foreground object illumination mask 904 also indicates that pixels 904-2 also corresponding to a portion of a foreground object that is exposed to high illumination.

Generated foreground object illumination masks may be published, sent or otherwise made available to other systems that utilize image data from one or more of the imaging devices. For example, the foreground object illumination mask 904 may be provided to an agent tracking system to inform the system of pixels of image data produced by imaging device 905-1 that are representative of agents that are exposed to high illumination. The agent tracking service may utilize the received foreground illumination mask to alter or adjust one or more tracking algorithms to account for the high illumination.

Figure 10:
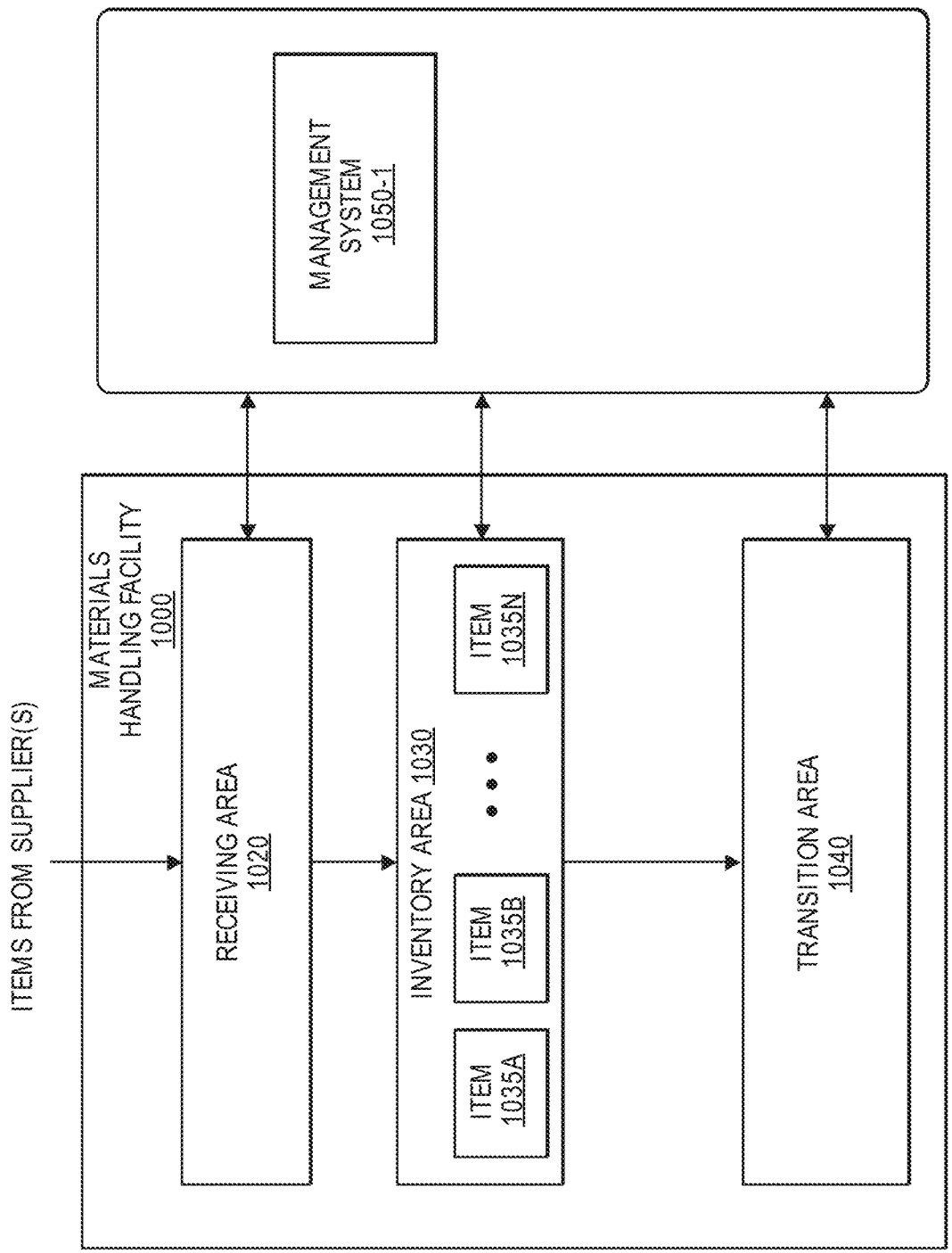
FIG. 10 is a block diagram illustrating a materials handling facility, in accordance with described implementations.

FIG. 10 illustrates a block diagram of a materials handling facility configured to store and manage inventory items, in accordance with the described implementations. As shown, a materials handling facility 1000 includes a receiving area 1020, an inventory area 1030 configured to store an arbitrary number of inventory items 1035A-1035N, and one or more transition areas 1040. The arrangement of the various areas within materials handling facility 1000 is depicted functionally rather than schematically. For example, in some implementations, multiple different receiving areas 1020, inventory areas 1030 and/or transition areas 1040 may be interspersed rather than segregated. Additionally, the materials handling facility 1000 includes an inventory management system 1050 configured to interact with each of receiving area 1020, inventory area 1030, transition area 1040 and/or agents within the materials handling facility 1000 and/or to interact with imaging devices within the materials handling facility and process image data to generate illumination masks, unified illumination maps, foreground object illumination masks, etc.

The materials handling facility 1000 may be configured to receive different kinds of inventory items 1035 from various suppliers and to store them until an agent retrieves one or more of the items. The general flow of items through the materials handling facility 1000 is indicated using arrows. Specifically, as illustrated in this example, items 1035 may be received from one or more suppliers, such as manufacturers, distributors, wholesalers, etc., at receiving area 1020. In various implementations, items 1035 may include merchandise, commodities, perishables, or any suitable type of item depending on the nature of the enterprise that operates the materials handling facility 1000.

Upon being received from a supplier at receiving area 1020, items 1035 may be prepared for storage. For example, in some implementations, items 1035 may be unpacked or otherwise rearranged and the inventory management system (which, as described, may include one or more software applications executing on a computer system) may be updated to reflect the type, quantity, condition, cost, location or any other suitable parameters with respect to newly received items 1035. It is noted that items 1035 may be stocked, managed or dispensed in terms of countable, individual units or multiples of units, such as packages, cartons, crates, pallets or other suitable aggregations. Alternatively, some items 1035, such as bulk products, commodities, etc., may be stored in continuous or arbitrarily divisible amounts that may not be inherently organized into countable units. Such items 1035 may be managed in terms of measurable quantities, such as units of length, area, volume, weight, or other dimensional properties characterized by units of measurement. Generally speaking, a quantity of an item 1035 may refer to either a countable number of individual or aggregate units of an item 1035 or a measurable amount of an item 1035, as appropriate.

After arriving through receiving area 1020, items 1035 may be stored within inventory area 1030 on an inventory shelf. In some implementations, like items 1035 may be stored or displayed together in bins, on shelves or via other suitable storage mechanisms, such that all items 1035 of a given kind are stored in one location. In other implementations, like items 1035 may be stored in different locations. For example, to optimize retrieval of certain items 1035 having high turnover or velocity within a large physical facility, those items 1035 may be stored in several different locations to reduce congestion that might occur at a single point of storage.

When an order specifying one or more items 1035 is received, or as an agent progresses through the materials handling facility 1000, the corresponding items 1035 may be selected or "picked" (an event) from the inventory area 1030. For example, in one implementation, an agent may have a list of items to pick and may progress through the materials handling facility picking items 1035 from the inventory area 1030. In other implementations, an agent may pick items 1035 using written or electronic pick lists derived from orders. In some instances, an item may need to be repositioned from one location within the inventory area 1030 to another location. For example, in some instances, an item may be picked from its inventory location, moved a distance, and placed (an event) at another location. An "event," as used herein, is a detected movement of an item. For example, an event may be a detected movement of an item when the item is picked from an inventory location or a detected movement of an item when the item is placed at an inventory location.

As discussed herein, as the agent moves through the materials handling facility, images of the agent may be obtained and processed to determine an agent pattern representative of the agent and to track a position of the agent as the agent moves. Likewise, in some implementations, descriptors representative of the agent may be periodically determined for the agent from the obtained images as the agent moves about the materials handling facility.

Figure 11:
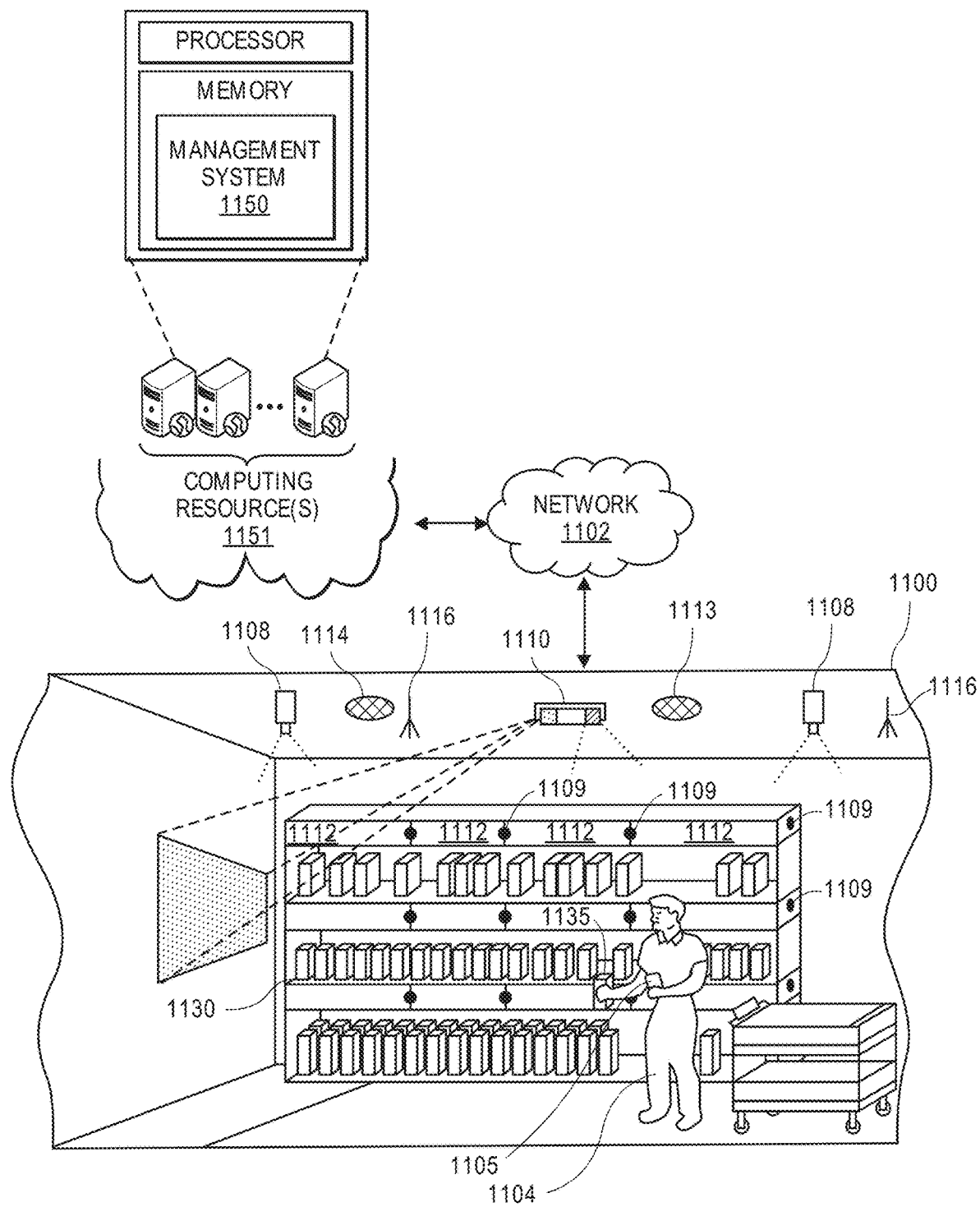
FIG. 11 shows additional components of the materials handling facility of FIG. 10, in accordance with described implementations.

FIG. 11 shows additional components of a materials handling facility 1100, according to one implementation. Generally, the materials handling facility 1100 may include one or more imaging devices 1108, 1109, such as cameras. In some implementations, the overhead imaging devices 1108 may be positioned overhead, such as on the ceiling, and oriented toward a surface (e.g., floor) of the materials handling facility so that the overhead imaging devices 1108 are approximately perpendicular with the surface and the field of view is oriented toward the surface. The overhead imaging devices 1108 are used to capture images of agents and/or locations within the materials handling facility from an overhead or top-down view. Likewise, one or more side-view imaging devices 1109 may be positioned on, inside, or adjacent to inventory areas and/or otherwise positioned and oriented so that an inventory location is within a field of view of the side-view imaging device 1109. For example, a series of side-view imaging devices 1109 may be positioned on external portions of inventory areas and oriented to capture images of agents and/or other inventory locations (e.g., those on an opposite side of an aisle). In some implementations, side-view imaging devices 1109 may be arranged throughout the materials handling facility such that each inventory location is within a field of view of at least two side-view imaging devices 1109.

Any type of imaging device and/or configuration of imaging devices may be used with the implementations described herein. In addition to imaging devices, other input devices, such as pressure sensors, infrared sensors, scales, light curtains, load cells, RFID readers, etc., may be utilized with the implementations described herein. For example, a pressure sensor and/or a scale may be used to detect the presence or absence of items and/or to determine when an item is added and/or removed from inventory areas. Likewise, an RFID reader that can detect a tag included on an item as the item passes into or out of the inventory location may be utilized to detect the presence or absence of an item. For example, if the item includes an RFID tag, an RFID reader may detect the RFID tag as the item passes into or out of the inventory location. Alternatively, or in addition thereto, the inventory shelf may include one or more antenna elements coupled to an RFID reader that are configured to read RFID tags of items located on the inventory shelf.

When an agent 1104 arrives at the materials handling facility 1100, one or more overhead images of the agent 1104 may be captured and processed to detect the agent. In addition, the agent may provide an identification (e.g., agent name, password), the agent may present an identifier (e.g., identification badge, card), an RFID tag in the possession of the agent may be detected, a visual tag (e.g., barcode, bokode, watermark) in the possession of the agent may be detected, etc. The image data may likewise be used to generate an agent pattern representative of the agent to facilitate tracking of the agent while the agent is located in the materials handling facility.

In some implementations, an agent located in the materials handling facility 1100 may possess a portable device 1105 and obtain information about items located within the materials handling facility 1100, receive confirmation that the inventory management system 1050-1 (FIG. 10) has correctly identified items that are picked and/or placed by the agent, receive requests for confirmation regarding one or more event aspects, etc. Generally, the portable device has at least a wireless module to facilitate communication with the management systems 1150 and a display (e.g., a touch based display) to facilitate visible presentation to and interaction with the agent. The portable device 1105 may store a unique identifier and provide that unique identifier to the management systems 1150 and be used to identify the agent. In some instances, the portable device may also have other features, such as audio input/output (e.g., speaker(s), microphone(s)), video input/output (camera(s), projector(s)), haptics (e.g., keyboard, keypad, touch screen, joystick, control buttons) and/or other components.

In some instances, the portable device may operate in conjunction with or may otherwise utilize or communicate with one or more components of the management system 1150. Likewise, components of the management system 1150 may interact and communicate with the portable device as well as identify the agent, communicate with the agent via other means and/or communicate with other components of the management system 1150.

Generally, the management system 1150 may include and/or communicate with one or more input/output devices, such as imaging devices (e.g., cameras) 1108, projectors 1110, displays 1112, speakers 1113, microphones 1114, illumination elements (e.g., lights), etc., to facilitate communication between the management system 1150 and/or the agent and detection of items, events and/or other actions within the materials handling facility 1100. In some implementations, multiple input/output devices may be distributed within the materials handling facility 1100. For example, there may be multiple imaging devices, such as imaging devices located on the ceilings (overhead cameras) and/or cameras (such as pico-cameras) located in the aisles near the inventory items (side-view cameras).

Likewise, the management system 1150 may also include one or more communication devices, such as wireless antennas 1116, which facilitate wireless communication (e.g., Wi-Fi, Near Field Communication (NFC), Bluetooth) between the management system 110 and other components or devices. The management system 1150 may also include or operate on one or more computing resource(s) 1151, such as a server system, that may be local to the environment (e.g., materials handling facility), remote from the environment, or any combination thereof.

The management system 1150 may utilize antennas 1116 within the materials handling facility 1100 to create a network 1102 (e.g., Wi-Fi) so that the components and devices can connect to and communicate with the management system 1150. For example, when the agent picks an item 1135 from an inventory area 1130, image data from an imaging device may be processed to detect the removal of the item and the management system 1150 may receive information, such as image data of the performed action (item pick from the inventory area), identifying that an item has been picked from the inventory area 1130. The event aspects (e.g., agent identity, action performed, item involved in the event) may then be determined by the management system 1150.

Figure 12:
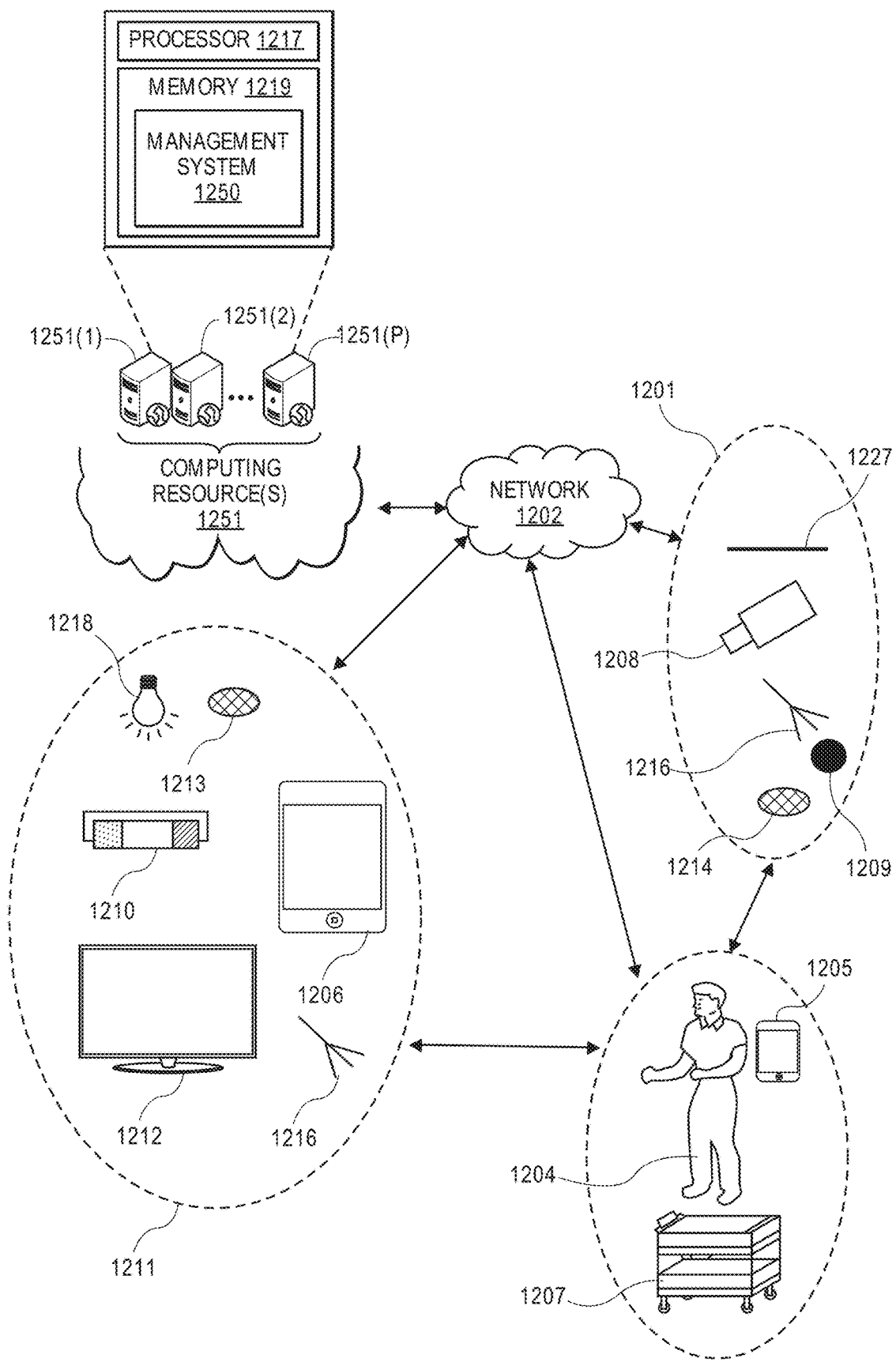
FIG. 12 shows components and communication paths between component types utilized in a materials handling facility of FIG. 10, in accordance with described implementations.

FIG. 12 shows example devices and communication paths between device types utilized in a materials handling facility, according to described implementations. A portable device 1205 may communicate and interact with various devices over a variety of communication paths. Generally, the system may include input components 1201, output components 1211 and computing resource(s) 1251. The input components 1201 may include an overhead imaging device 1208, side-view imaging device 1209, a multiple-device apparatus 1227, microphone 1214, antenna 1216, or any other device or component that is capable of receiving input about the surrounding environment and/or from the agent. The output components 1211 may include a projector 1210, a portable device 1206, a display 1212, an antenna 1216, a radio (not shown), speakers 1213, illumination sources 1218 (e.g., lights), and/or any other device or component that is capable of providing output to the surrounding environment and/or the agent.

The system may also include computing resource(s) 1251. The computing resource(s) 1251 may be local to the environment (e.g., materials handling facility), remote from the environment, or any combination thereof. Likewise, the computing resource(s) 1251 may be configured to communicate over a network 1202 with input components 1201, output components 1211 and/or directly with the portable device 1205, an agent 1204 and/or the tote 1207.

As illustrated, the computing resource(s) 1251 may be remote from the environment and implemented as one or more servers 1251(1), 1251(2), . . . , 1251(P) and may, in some instances, form a portion of a network-accessible computing platform implemented as a computing infrastructure of processors, storage, software, data access, and so forth that is maintained and accessible by components/devices of the system materials handling facility and/or the portable device 1205 via a network 1202, such as an intranet (e.g., local area network), the Internet, etc. The computing resources 1251 may process images of agents to identify the agent, process images of items to identify items, determine a location of items, determine a position of items, determine if sunlight is present in one or more of the generated images, and the like. The server system(s) 1251 does not require end-agent knowledge of the physical location and configuration of the system that delivers the services. Common expressions associated for these remote computing resource(s) 1251 include "on-demand computing," "software as a service (SaaS)," "platform computing," "network-accessible platform," "cloud services," "data centers," and so forth.

Each of the servers 1251(1)-(P) include a processor 1217 and memory 1219, which may store or otherwise have access to management system 1250, which may include or provide image processing (e.g., for agent identification, item identification, etc.), inventory tracking, and/or location determination, and also may store or otherwise have access to the inventory management service 1250.

The network 1202 may utilize wired technologies (e.g., wires, USB, fiber optic cable, etc.), wireless technologies (e.g., radio frequency, infrared, NFC, cellular, satellite, Bluetooth, etc.), or other connection technologies. The network 1202 is representative of any type of communication network, including data and/or voice network, and may be implemented using wired infrastructure (e.g., cable, CAT5, fiber optic cable, etc.), a wireless infrastructure (e.g., RF, cellular, microwave, satellite, Bluetooth, etc.), and/or other connection technologies.

The various sensors and computer systems described above may collect a wide variety of data relating to users of systems or facilities employing such sensors or computer systems. The data relating to users may include, for example, images, video, location information, travel patterns, personal identification information, transaction history information, user preferences, and the like. The sensors, systems, and techniques described herein would be typically configured to process this information in a manner that ensures compliance with all appropriate laws, regulations, standards, and the like.

Figure 13:
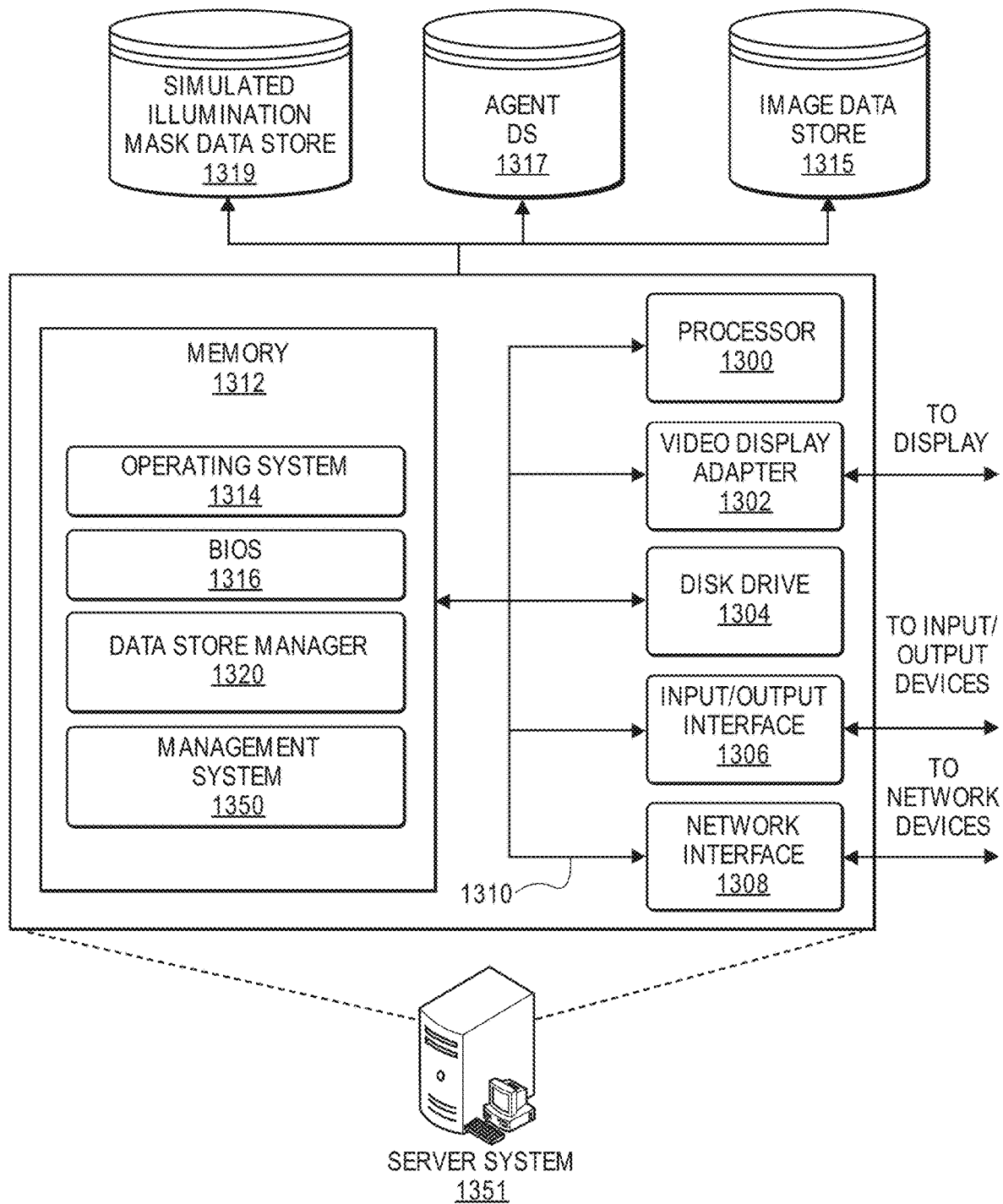
FIG. 13 is a block diagram of an illustrative implementation of a server system that may be used with various implementations.

FIG. 13 is a pictorial diagram of an illustrative implementation of a server system, such as the server system 1351, that may be used in the implementations described herein. The server system 1351 may include a processor 1300, such as one or more redundant processors, a video display adapter 1302, a disk drive 1304, an input/output interface 1306, a network interface 1308, and a memory 1312. The processor 1300, the video display adapter 1302, the disk drive 1304, the input/output interface 1306, the network interface 1308, and the memory 1312 may be communicatively coupled to each other by a communication bus 1310.

The video display adapter 1302 provides display signals to a local display permitting an operator of the server system 1351 to monitor and configure operation of the server system 1351. The input/output interface 1306 likewise communicates with external input/output devices, such as a mouse, keyboard, scanner, or other input and output devices that can be operated by an operator of the server system 1351. The network interface 1308 includes hardware, software, or any combination thereof, to communicate with other computing devices. For example, the network interface 1308 may be configured to provide communications between the server system 1351 and other computing devices and/or services via a network, such as the network shown in FIG. 12.

The memory 1312 generally comprises random access memory (RAM), read-only memory (ROM), flash memory, and/or other volatile or permanent memory. The memory 1312 is shown storing an operating system 1314 for controlling the operation of the server system 1351. A binary input/output system (BIOS) 1316 for controlling the low-level operation of the server system 1351 is also stored in the memory 1312.

The memory 1312 additionally stores program code and data for providing network services. The data store manager application 1320 facilitates data exchange between the image data store 1315, the agent data store 1317, and/or the simulated illumination masks data store 1319.

As used herein, the term "data store" refers to any device or combination of devices capable of storing, accessing and retrieving data which may include any combination and number of data servers, databases, data storage devices and data storage media in any standard, distributed or clustered environment. The server system 1351 can include any appropriate hardware and software for integrating with the data stores 1315, 1317, and 1319 as needed to execute aspects of the management system 1350.

The data stores 1315, 1317, and 1319 can include several separate data tables, databases or other data storage mechanisms and media for storing data relating to a particular aspect. For example, the data stores 1315, 1317, and 1319 illustrated include mechanisms for maintaining simulated illumination masks, agent information, images, etc.

It should be understood that there can be many other aspects that may be stored in the data stores 1315, 1317, and 1319. The data stores 1315, 1317, and 1319 are operable, through logic associated therewith, to receive instructions from the server system 1351 and obtain, update or otherwise process data in response thereto.

The memory 1312 may also include the inventory management system 1350. The management system 1350 may be executable by the processor 1300 to implement one or more of the functions of the server system 1351. In one implementation, the management system 1350 may represent instructions embodied in one or more software programs stored in the memory 1312. In another implementation, the management system 1350 can represent hardware, software instructions, or a combination thereof.

It will be appreciated by those of ordinary skill in the art that such a system could operate equally well in a system having fewer or a greater number of components than are illustrated in FIG. 13. Thus, the depiction in FIG. 13 should be taken as being illustrative in nature and not limiting to the scope of the disclosure.

The concepts disclosed herein may be applied within a number of different devices and computer systems, including, for example, general-purpose computing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, communications, and image processing should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some or all of the specific details and steps disclosed herein.

For example, while the implementations are described as detecting portions of an environment that is exposed to high illumination, such as sunlight or other excessive lighting change, the disclosed implementations are equally applicable to detect other forms of light that cause overexposure or saturation of image data and should not be considered as limited to sunlight detection alone.

Aspects of the disclosed systems may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk and/or other media. In addition, components of one or more of the modules and engines may be implemented in firmware or hardware.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A system, comprising:
    a first camera located in a materials handling facility and having a first field of view that includes a first view of an inventory area within the materials handling facility;
    a second camera located in the materials handling facility and having a second field of view that at least partially overlaps with the first field of view and includes a second view of the inventory area;
    a computing system, including:
        one or more processors; and
        a memory storing program instructions that when executed by the one or more processors cause the one or more processors to at least:
            receive first image data from the first camera;
            obtain, from a data store, first background image data corresponding to the first camera that includes a first background representation of the first field of view captured under known lighting conditions;

compare the first image data with the first background image data to produce a first illumination mask indicating a first plurality of pixels of the first image data representative of a first portion of the inventory area that, as represented in the first image data, is exposed to sunlight;

receive second image data from the second camera;

obtain, from the data store, second background image data corresponding to the second camera that includes a second background representation of the second field of view captured under known lighting conditions;

compare the second image data with the second background image data to produce a second illumination mask indicating a second plurality of pixels of the second image data representative of a second portion of the inventory area that, as represented in the second image data, is exposed to sunlight;

determine a first set of pixels of the first illumination mask corresponding to a third portion of the inventory area;

determine a second set of pixels of the second illumination mask corresponding to the third portion of the inventory area;

determine a plurality of physical points of the third portion of the inventory area represented by one or more pixels of the first set of pixels from the first illumination mask or the second set of pixels from the second illumination mask;

determine, based on the plurality of physical points and the one or more pixels, a probability value that the third portion of the inventory area is exposed to sunlight; and produce a unified illumination map that includes an indication of the probability value that the third portion of the inventory area is exposed to sunlight.

2. The system of claim 1, wherein the program instructions further include instructions that when executed by the one or more processors cause the one or more processors to at least:

compare the first image data with the first background image data to determine a third plurality of pixels of the first image data representative of a foreground object that is not represented in the first background image data; and indicate in the first illumination mask that the third plurality of pixels represent the foreground object or that the third plurality of pixels are undetermined.

3. The system of claim 1, wherein the program instructions further include instructions that when executed by the one or more processors cause the one or more processors to at least:

determine, based at least in part on the unified illumination map, that at least a portion of the inventory area is exposed to sunlight; and in response to determining that at least a portion of the inventory area is exposed to sunlight, cause at least one action to be performed, wherein the action is at least one of physically altering a position of one or more objects to reduce an amount of sunlight at the inventory area, altering a camera parameter of the first camera, or altering an algorithm that utilizes image data from the first camera.

4. The system of claim 1, wherein the program instructions further include instructions that when executed by the one or more processors cause the one or more processors to at least:

convert pixel values of the first image data to grayscale pixel values to produce first grayscale image data; and wherein the comparison of the first image data with the first background image data includes a determination of an intensity value difference between pixels of the first grayscale image data and pixels of the first background image data.

5. A computing system, comprising:

one or more processors; and a memory coupled to the one or more processors and storing program instructions that when executed by the one or more processors cause the one or more processors to at least:

receive, from a first imaging device, first image data representative of a first view of a location;

receive, from a second imaging device, second image data representative of a second view of the location;

determine a first set of pixels of the first image data corresponding to a first portion of the location;

determine a second set of pixels of the second image data corresponding to the first portion of the location;

select a plurality of physical points corresponding to the first portion of the location; and determine pixel values from the first set of pixels and the second set of pixels corresponding to the plurality of physical points;

determine, based at least in part on the pixel values, a probability value that the first portion of the location represented by the first set of pixels and the second set of pixels is exposed to a high illumination; and produce a unified illumination map that includes an indication of the probability value.

6. The computing system of claim 5, wherein:

the first image data includes an illumination mask including, for each pixel of the first image data, an indication whether the pixel is representative of a portion of the location that is exposed to the high illumination; and the program instructions further include instructions that when executed by the one or more processors cause the one or more processors to at least:

determine, based at least in part on the pixel values and the indication whether the pixel is representative of the portion of the location that is exposed to the high illumination, the probability value.

7. The computing system of claim 5, wherein the program instructions further include instructions that when executed by the one or more processors cause the one or more processors to at least:

receive, from a third imaging device, third image data representative of a third view of the location; and wherein the pixel values further include pixel values of the third image data.

8. The computing system of claim 5, wherein at least a portion of the first view and the second view overlap.

9. The computing system of claim 5, wherein the high illumination is at least one of sunlight or an excessive lighting change at the location.

10. The computing system of claim 5, wherein:

the location is an inventory location within a materials handling facility;

the first imaging device is at a first overhead position and oriented toward the inventory location; and the second imaging device is at a second overhead position and oriented toward the inventory location.

11. The computing system of claim 5, wherein the program instructions further include instructions that when executed by the one or more processors cause the one or more processors to at least:
send the unified illumination map to at least one service such that the at least one service takes an action based on the unified illumination map, wherein the action is at least one of altering an algorithm, open or close a window blind, or control a light projection.

12. The computing system of claim 5, wherein the program instructions further include instructions that when executed by the one or more processors cause the one or more processors to at least:
determine, from the first image data, a second plurality of pixels representative of a second portion of the location that is exposed to the high illumination and
determine, from the second image data, a third plurality of pixels representative of the second portion of the location that is exposed to the high illumination; and
determine, based at least in part on the second plurality of pixels and the third plurality of pixels, a second probability value that the second portion of the location is exposed to high illumination.

13. The computing system of claim 5, wherein the program instructions further include instructions that when executed by the one or more processors cause the one or more processors to at least:
process the first image data to determine a second plurality of pixels representative of a foreground object; and
wherein the unified illumination map does not indicate a probability value for the second plurality of pixels.

14. A system, comprising:
a first imaging device having a first view of a location, the first imaging device including:
a first computing component configured to at least:
process first image data of the first imaging device to produce a first illumination mask, the first illumination mask indicating pixels of the first image data representative of first portions of the location exposed to high illumination as viewed by the first imaging device;
a second imaging device having a second view of the location, the second imaging device including:
a second computing component configured to at least:
process second image data of the second imaging device to produce a second illumination mask, the second illumination mask indicating pixels of the second image data representative of second portions of the location exposed to high illumination as viewed by the second imaging device;
a computing system, including:
one or more processors; and
a memory storing program instructions that when executed by the one or more processors cause the one or more processors to at least:
receive, from the first imaging device, the first illumination mask;
receive, from the second imaging device, the second illumination mask;
randomly select a plurality of points corresponding to a third portion of the location; and
determine, based at least in part on pixel values of the first illumination mask corresponding to the plurality of points and pixel values of the second illumination mask corresponding to the plurality of points, a probability value that the third portion of the location is exposed to high illumination; and
produce a unified illumination map that includes an indication of the probability value.

15. The system of claim 14, wherein the first computing component is further configured to at least:
convert the first image data to first grayscale image data;
compute, for each pixel of the first grayscale image data, an intensity difference between the pixel of the first grayscale image data and a corresponding pixel of background image data associated with the first imaging device; and
include in the first illumination mask, an indicator of each pixel having an intensity difference that exceeds a threshold.

16. The system of claim 14, wherein the first computing component is further configured to at least:
convert the first imaging data to first grayscale image data;
compute, for each pixel of the first grayscale image data, a correlation score between the pixel of the grayscale image data and a corresponding pixel of background image data associated with the first imaging device;
determine a first plurality of pixels of the first grayscale image data having a correlation score below a threshold; and
exclude the first plurality of pixels from the first illumination mask.

17. The system of claim 14, further comprising:
a plurality of imaging devices, including the first imaging device and the second imaging device, wherein each imaging device of the plurality of imaging devices include a computing component configured to generate an illumination mask from image data produced by the imaging device; and
wherein the program instructions further include instructions that when executed by the one or more processors cause the one or more processors to at least:
receive, from each of the plurality of imaging devices, an illumination mask;
determine a number of imaging devices with a view of the plurality of points; and
determine, based at least in part on pixels of each illumination mask received from the number of imaging devices with a view of the plurality of points, the probability value.

18. The system of claim 14, wherein the plurality of points correspond to physical points at the location; and
wherein the program instructions further include program instructions that cause the one or more processors to at least:
determine at least a first pixel of the first illumination mask that is representative of a point of the plurality of points; and
determine at least a second pixel of the second illumination mask that is representative of the point of the plurality of points; and
wherein the probability value is determined based at least in part on a first pixel value of the first pixel and a second pixel value of the second pixel.

19. The system of claim 14, wherein the program instructions further include instructions that when executed by the one or more processors cause the one or more processors to at least:

determine, based at least in part on the unified illumination map, that at least a fourth portion of the location is exposed to high illumination; and in response to determining that at least a fourth portion of the location is exposed to high illumination, cause at least one action to be performed, wherein the action is at least one of physically altering a position of one or more objects to reduce an amount of illumination at the location, altering a parameter of the first imaging device, or altering an algorithm that utilizes image data from the first imaging device.

20. The system of claim 14, wherein:

the location is an inventory location within a materials handling facility;

the first imaging device is at a first position within the materials handling facility; and the second imaging device is at a second position within the materials handling facility.

* * * * *